US010538421B2

(12) United States Patent
Blevins et al.

(10) Patent No.: US 10,538,421 B2
(45) Date of Patent: Jan. 21, 2020

(54) SYSTEMS, DEVICES, AND METHODS FOR INVENTORY MANAGEMENT OF CARPET ROLLS IN A WAREHOUSE

(71) Applicant: Atlantic Corporation, Wilmington, NC (US)

(72) Inventors: Joshua William Blevins, Wilmington, NC (US); John Alan Little, Wilmington, NC (US); Michael A. Peeples, Wilmington, NC (US); Chandler Ryan Grant, Wilmington, NC (US)

(73) Assignee: Atlantic Corporation, Wilmington, NC (US)

( * ) Notice: Subject to any disclaimer, the term of this patent is extended or adjusted under 35 U.S.C. 154(b) by 0 days.

(21) Appl. No.: 15/588,147

(22) Filed: May 5, 2017

(65) Prior Publication Data

US 2018/0319594 A1    Nov. 8, 2018

(51) Int. Cl.
*B66F 9/08* (2006.01)
*B66F 9/06* (2006.01)
(Continued)

(52) U.S. Cl.
CPC .............. *B66F 9/08* (2013.01); *B65G 1/1375* (2013.01); *B66F 9/06* (2013.01); *B66F 9/087* (2013.01);
(Continued)

(58) Field of Classification Search
CPC ..................................... B66F 9/08; B66F 9/06
See application file for complete search history.

(56) References Cited

U.S. PATENT DOCUMENTS 3,705,658 A * 12/1972 Harris ....................... B66F 9/12
414/607
3,763,619 A * 10/1973 Stone ..................... B65D 85/66
53/410
(Continued)

FOREIGN PATENT DOCUMENTS

EP         3 081 511 A2    10/2016

OTHER PUBLICATIONS

"Automated Warehousing Using Robotics Forklifts," Cybernet Systems Corporation, Journal of Engineering, 2053, 5 pages, Oct. 8, 2014.
(Continued)

*Primary Examiner* — Thomas Randazzo
(74) *Attorney, Agent, or Firm* — Jenkins, Wilson, Taylor & Hunt, P.A.

(57) ABSTRACT

A system for managing an inventory of carpet rolls within a warehouse includes one or more autonomous lift trucks, a database configured to store location information for a plurality of carpet rolls in the warehouse, a server in electronic communication with the database, and a system manager configured to send one or more instructions to the one or more lift trucks. The one or more autonomous lift trucks include a frame, a mast attached to the frame, a pole fixedly mounted on the mast, the pole being configured for insertion within a core of a carpet roll for transport of the carpet roll, a plurality of imaging devices mounted on each lift truck in a displaceable manner, at least one navigation sensor, at least one safety sensor, at least one emergency stop, and at least three wheels.

27 Claims, 20 Drawing Sheets

(51) Int. Cl.
  *G06Q 10/08*    (2012.01)
  *B65G 1/137*    (2006.01)
  *G06Q 50/28*    (2012.01)
  *G06Q 50/30*    (2012.01)
  *G05B 9/02*     (2006.01)
  *B66F 9/18*     (2006.01)

(52) U.S. Cl.
  CPC .................. *B66F 9/18* (2013.01); *G05B 9/02* (2013.01); *G06Q 10/087* (2013.01); *G06Q 50/28* (2013.01); *G06Q 50/30* (2013.01)

(56) References Cited

U.S. PATENT DOCUMENTS

| | | | | |
|---|---|---|---|---|
| 4,544,324 | A * | 10/1985 | Hornung | B66F 9/12 24/512 |
| 4,968,209 | A * | 11/1990 | Noble | B65G 1/02 180/169 |
| 5,163,725 | A * | 11/1992 | Leweallyn | B65H 75/185 294/219 |
| 5,320,197 | A * | 6/1994 | Connerley | B66B 9/16 187/230 |
| 5,878,844 | A * | 3/1999 | Carter | B66F 9/063 187/226 |
| 5,986,560 | A * | 11/1999 | Rayburn | G01G 19/083 177/136 |
| 6,417,641 | B2 | 6/2002 | Peless et al. | |
| 7,243,001 | B2 | 7/2007 | Janert et al. | |
| 7,591,630 | B2 | 9/2009 | Lert, Jr. | |
| 7,693,757 | B2 | 4/2010 | Zimmerman | |
| 7,896,243 | B2 | 3/2011 | Herskovitz | |
| 7,900,732 | B2 * | 3/2011 | Brown | B66F 9/105 180/210 |
| 8,050,863 | B2 | 11/2011 | Trepagnier et al. | |
| 8,195,394 | B1 | 6/2012 | Zhu et al. | |
| 8,364,334 | B2 | 1/2013 | Au et al. | |
| 8,425,173 | B2 | 4/2013 | Lert et al. | |
| 8,434,598 | B2 * | 5/2013 | Simpson | B66F 9/18 187/230 |
| 8,437,875 | B2 | 5/2013 | Hernandez et al. | |
| 8,527,124 | B2 * | 9/2013 | Velde | B60L 3/104 701/22 |
| 8,538,577 | B2 * | 9/2013 | Bell | B66F 9/0755 414/273 |
| 8,833,523 | B2 * | 9/2014 | Simpson | B66F 9/08 182/141 |
| 8,954,188 | B2 | 2/2015 | Sullivan et al. | |
| 8,965,561 | B2 * | 2/2015 | Jacobus | G06Q 10/087 700/216 |
| 9,045,320 | B2 * | 6/2015 | Turrini | B60P 3/1091 |
| 9,120,622 | B1 | 9/2015 | Elazary et al. | |
| 9,146,559 | B2 * | 9/2015 | Kuss | B66F 9/063 |
| 9,260,244 | B1 | 2/2016 | Cohn | |
| 9,317,037 | B2 | 4/2016 | Byford et al. | |
| 9,321,591 | B2 | 4/2016 | Lert et al. | |
| 9,428,336 | B2 | 8/2016 | Hagen et al. | |
| 9,477,938 | B1 | 10/2016 | Russell et al. | |
| 9,487,356 | B1 | 11/2016 | Aggarwal | |
| 9,488,984 | B1 | 11/2016 | Williams et al. | |
| 9,507,346 | B1 | 11/2016 | Levinson et al. | |
| 9,519,880 | B1 | 12/2016 | Cohn | |
| 9,519,882 | B2 * | 12/2016 | Galluzzo | B25J 5/007 |
| 9,547,945 | B2 * | 1/2017 | McCabe | B66F 9/063 |
| 9,550,499 | B2 * | 1/2017 | Sakai | G05B 9/02 |
| 9,550,624 | B2 | 1/2017 | Khodl et al. | |
| 9,561,941 | B1 | 2/2017 | Watts | |
| 9,573,684 | B2 | 2/2017 | Kimchi et al. | |
| 9,828,223 | B2 * | 11/2017 | Svensson | B66F 9/07 |
| 2013/0083623 | A1 | 4/2013 | Brizard et al. | |
| 2014/0267703 | A1 | 9/2014 | Taylor et al. | |
| 2015/0120498 | A1 | 4/2015 | Carney et al. | |
| 2016/0086050 | A1 | 3/2016 | Piekniewski et al. | |
| 2016/0207710 | A1 | 7/2016 | Conrad et al. | |
| 2016/0320773 | A1 | 11/2016 | Skaaksrud | |
| 2017/0043953 | A1 | 2/2017 | Battles et al. | |

OTHER PUBLICATIONS

Correa et al., "Multimodal Interaction with an Autonomous Forklift," IEEE, pp. 243-250, Apr. 5, 2012. Accessed Mar. 13, 2017.

D'Andrea et al., "Future challenges of coordinating hundreds of autonomous vehicles in distribution facilities," IEEE, pp. 80-83, 2008.

Enright et al., "Optimization and Coordinated Autonomy in Mobile Fulfillment Systems," Automated Action Planning for Autonomous Mobile Robots: Papers from the 2011 AAAI Workshop (WS-11-09), Association for the Advancement of Ariticial Intelligence, pp. 33-38, 2011.

"Kollmorgen's New CVC600 Vehicle Controller Delivers Big Performance in Tight Spaces and Tough Conditions," Kollmorgen Press Release, 2 pages, Dec. 9, 2010, www.kollmorgen.com.

Patent Search Report for "Retrieving an Item with an Autonomous Vehicle," Cardinal Intellectual Property, Evanston, IL, USA, pp. 1-20, dated Mar. 13, 2017.

Patent Search Report for "Warehouse Inventory Mapping," Cardinal Intellectual Property, Evanston, IL, USA, pp. 1-18, dated Mar. 13, 2017.

"The O3D Smart Sensor", 3D Smart Sensor—for Industrial Applications, IFM, 1 page, 2017.

"Sensor Integration Machine: SIM4000," SICK Sensor Intelligence, 2 pages, www.sick.com.

"picoCam," Product Portfolio, SICK Sensor Intelligence, 3 pages, www.sick.com.

"TiM5xx," Product Portfolio, SICK Sensor Intelligence, 2 pages, www.sick.com.

* cited by examiner

SYSTEMS, DEVICES, AND METHODS FOR INVENTORY MANAGEMENT OF CARPET ROLLS IN A WAREHOUSE

TECHNICAL FIELD

The subject matter disclosed herein relates to inventory management and storage and retrieval of inventory in a warehouse or like environments. In particular, the presently disclosed subject matter relates to using autonomously guided vehicles (e.g., pole-equipped lift trucks) configured for storage and retrieval of objects (e.g., carpet rolls), as well as associated methods for managing inventory within a warehouse.

BACKGROUND

Traditionally, lift trucks used in retrieving, transporting, and depositing carpet rolls are manually operated by humans and are equipped with poles in place of forks to move carpet rolls of various sizes and weights. This is accomplished by the human operators manually driving the lift trucks to a specific position, manually verifying a carpet roll, maneuvering the lift truck to align the pole with a core of a carpet roll, and inserting the pole within the core. After this, the lift truck is manually driven to a destination for delivery, during which time various obstacles must be detected by the lift truck operator and navigated around, all while ensuring that the carpet roll and/or pole do not strike anything while the lift truck is in motion. Human operators are prone to commit errors that are otherwise avoidable, including depositing an item in an incorrect place, retrieving an incorrect item, colliding with structural components of the warehouse (e.g., the shelving racks, the walls, etc.), other vehicles, and/or human occupants in the vicinity of the vehicle, etc. These errors can result from inattentive or careless operation, misperception of the vehicle's surroundings, improper training, operator fatigue, and the like. Each of these errors can be remedied, at least to some degree, through the use of autonomous vehicles. Additionally, the use of human operators has significant ongoing costs associated therewith, including staffing costs, increased liability insurance costs, productivity inefficiencies, and the limit of how long a human operator is capable of operating a vehicle without interruption, moving briskly from task to task. The implementation of autonomous lift trucks requires fewer employees to be located in potentially dangerous positions, such as being co-located with the vehicles on the warehouse floor. Because such manually operated lift trucks present dangers to pedestrians, other vehicles, and structural components of a warehouse or other structure, a need exists for an autonomous lift truck that can retrieve, transport, and deposit carpet rolls within a warehouse.

SUMMARY

According to one aspect, a system for managing an inventory of carpet rolls in a warehouse is provided. This system includes one or more autonomous lift trucks a database configured to store location information for a plurality of carpet rolls in the warehouse; a server in electronic communication with the database; and a system manager configured to send one or more instructions to the one or more lift trucks. The one or more lift trucks include a frame; a mast attached to the frame; a pole fixedly mounted on the mast, wherein the pole is configured to be inserted concentrically within a core of a carpet roll to lift the carpet roll for transport; a plurality of imaging devices mounted on each lift truck in a displaceable manner; at least one navigation sensor; at least one safety sensor; at least one emergency stop; and at least three wheels, comprising two traction wheels located in a same vertical plane on opposite sides of the lift truck and one steering wheel, wherein the traction wheels are each configured to apply a locomotive force to the lift truck and the steering wheel is configured to rotate to change a direction of travel of the lift truck.

According to another aspect, a lift truck for autonomous storage and retrieval of carpet rolls in a warehouse is provided. This lift truck includes a frame; a mast attached to the frame; a cylindrically-shaped pole fixedly mounted on the mast by a carrier, wherein the pole is configured to be inserted concentrically within a core of a carpet roll to lift the carpet roll for transport; a plurality of imaging devices mounted on each lift truck in a displaceable manner; at least one navigation sensor; at least one safety sensor; at least one emergency stop; and at least three wheels, comprising two traction wheels located in a same vertical plane on opposite sides of the lift truck and one steering wheel, wherein the traction wheels are each configured to apply a locomotive force to the lift truck and the steering wheel is configured to rotate to change a direction of travel of the lift truck.

According to still another aspect, a method of managing an inventory of carpet rolls in a warehouse is provided. This method includes the steps of: providing one or more lift trucks in a warehouse comprising a plurality of carpet rolls on one or more carpet racks; sending, via a system manager, at least one instruction to a lift truck of the one or more lift trucks; determining an origin point associated with the at least one instruction; moving the lift truck to the origin point specified in the at least one instruction; scanning, via an infrared camera, carpet rolls on a carpet rack located to a side of a transit path determined by the lift truck moving to the origin point; detecting, via image processing, the carpet rolls scanned by the infrared camera; moving, once an identity of a carpet roll specified in the at least one instruction is detected, the lift truck to an insertion position, such that a pole attached to the lift truck is aligned with a core of the carpet roll specified in the at least one instruction; verifying, via an infrared pole camera mounted on a distal end of the pole, the identity of the carpet roll detected; processing one or more images from the pole camera to determine a center of the core of the carpet roll; inserting, after the identity of the carpet roll is verified and the center of the core is determined, the pole into the center of the core of the carpet roll; raising a mast, by which the pole is attached to the lift truck, to lift the carpet roll; transporting, using the lift truck, the carpet roll to a destination point specified by the at least one instruction; depositing the carpet roll at the destination point; transmitting, via a wireless antenna the system manager, a location and/or a height within the warehouse where the carpet roll was deposited; and storing the location and/or height in a database.

DETAILED DESCRIPTION

Figure 1A:
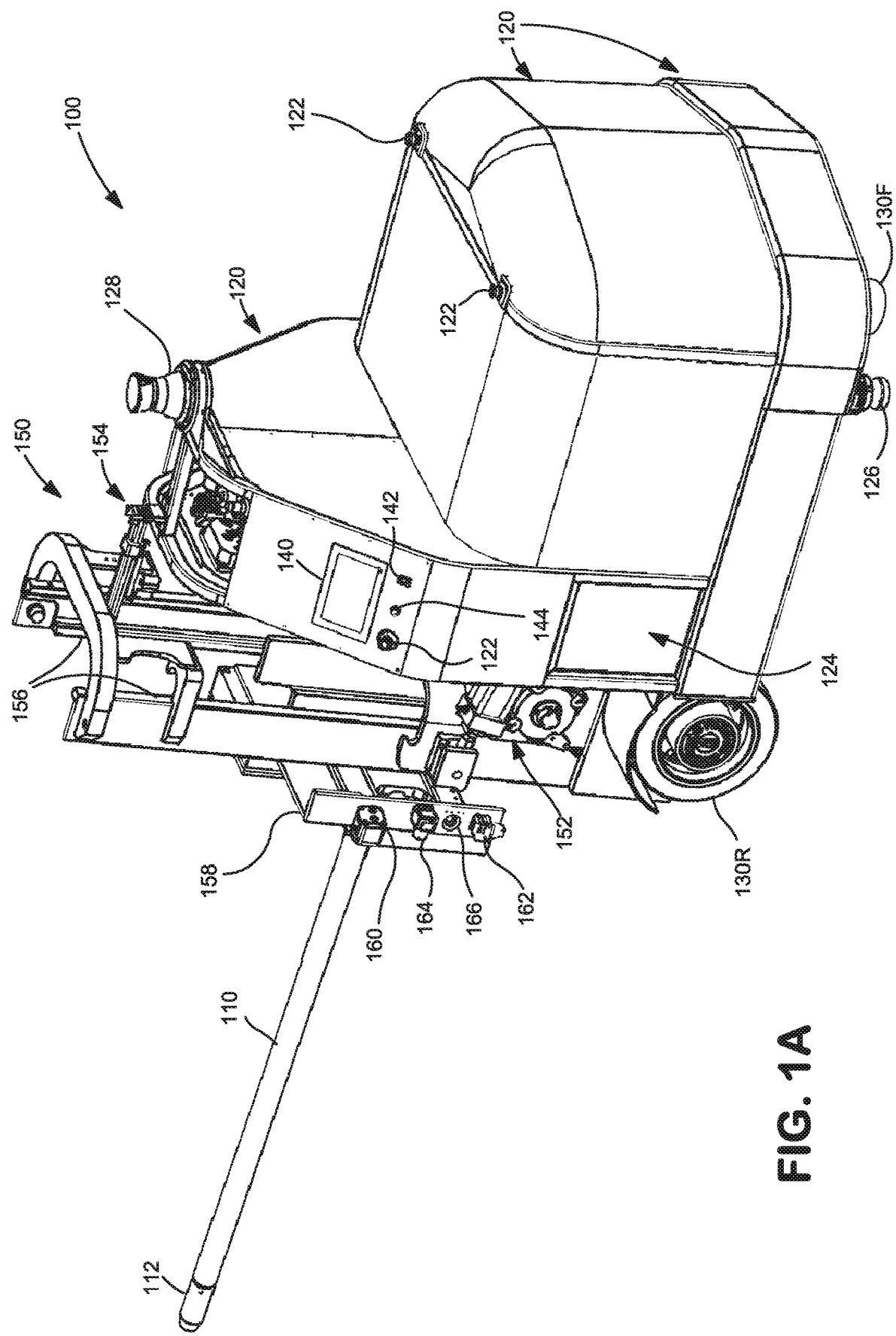
FIGS. 1A and 1B show an example embodiment of a lift truck configured for autonomous storage and retrieval of carpet rolls, in accordance with the disclosure herein.

This disclosure relates to systems, devices, and methods of managing an inventory of carpet rolls in a warehouse using one or more autonomous lift trucks.

The presently disclosed subject matter now will be described more fully hereinafter, in which some, but not all embodiments of the presently disclosed subject matter are described. Indeed, the presently disclosed subject matter can be embodied in many different forms and should not be construed as limited to the embodiments set forth herein; rather, these embodiments are provided so that this disclosure will satisfy applicable legal requirements.

The terminology used herein is for the purpose of describing particular embodiments only, and is not intended to be interpreted as in any way limiting the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one of skill in the art. While the following terms are believed to be well understood by one of ordinary skill in the art, the following definitions are set forth to facilitate explanation of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Following long-standing patent law convention, the terms "a", "an", and "the" refer to "one or more" when used in this application, including the claims. Thus, for example, reference to "a tool" includes a plurality of such tools, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

Figure 1B:
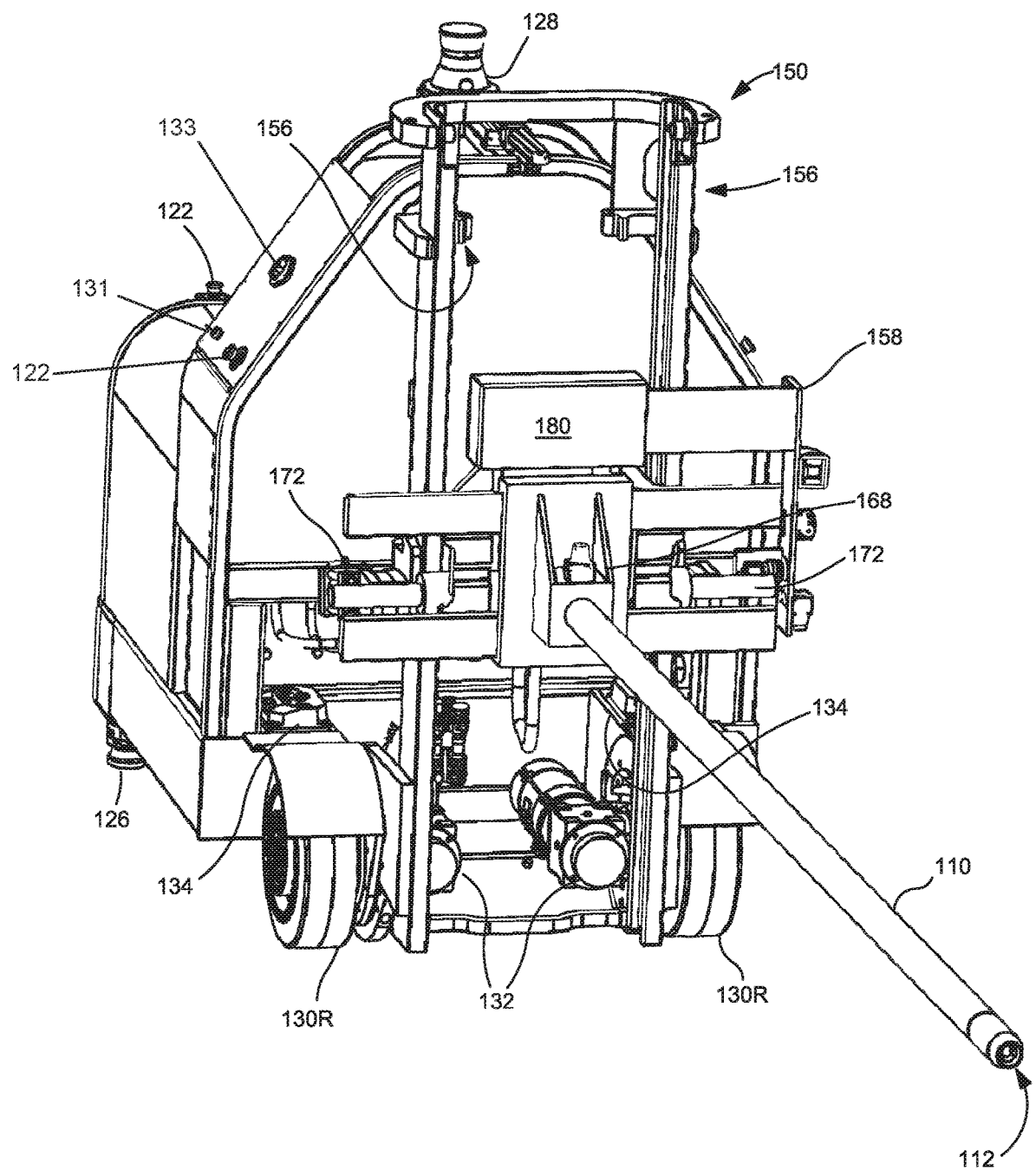

FIGS. 1A and 1B show an embodiment of a lift truck, generally designated 100, that is equipped with a pole 110 at one end of lift truck 100.

Lift truck 100 has three or more wheels in contact with the ground. A single wheel 130F is disposed towards a front of lift truck 100 relative to its transport direction of travel. Wheel 130F is configured to pivot to steer lift truck 100. In order to pivot, the angular position of wheel 130F is detected by one or more sensors in electrical communication with a controller (e.g., in control box 180, see FIG. 1B), which provides commands for a steering motor configured to apply a rotary force to pivot wheel 130F to be aligned with a transit path. In some embodiments, an electric motor can be attached to wheel 130F so that a locomotive rotational force can be applied to wheel 130F for forward and reverse movement of lift truck 100 along the transit path. In other embodiments, lift truck 100 may have a plurality of wheels at the forward position of wheel 130F, the rotational position of which can be controlled via, for example, an axle and a rack-and-pinion steering arrangement, with the movement of the pinion being controlled by an electric motor and assorted position sensors.

Lift truck 100 has, at or adjacent to its rear portion, excluding the rearward protrusion of pole 110, two traction wheels 130R. Any number of traction wheels 130R may be used, including a single wheel. Wheels 130R are connected to separate traction motors 132 and traction drives 134, which are configured for independent speed control of wheels 130R. As such, wheels 130R may be rotated at different speeds in order to aid lift truck 100 in performing turning maneuvers and/or laterally pivoting lift truck 100 to align pole 110 with the core of the carpet roll. In some such embodiments, front wheel 130F may be a wheel that is free to pivot without an angular position thereof being controlled by a steering motor. Wheels 130R may also be rotated at the same speed, such as is possible by a controller providing a substantially identical drive signal to the respective traction motors 132. In some embodiments, a single traction motor 132 and/or traction drive 134 may be used to drive wheels 130R at the same speed. This may be accomplished, e.g., by a differential configured to allocate and/or split the locomotive power to wheels 130R. In some other aspects, wheels 130R may be configured to pivot for further enhanced maneuverability of lift truck 100.

In some embodiments, the positions of front wheel 130F and rear wheels 130R may be reversed, so that the traction wheels are at the front of lift truck 100 while the steering wheel(s) are located at the rear of lift truck 100, excluding pole 110. Front and rear wheels 130F and 130R are connected to a frame 120 of lift truck 100. Frame 120 is configured to provide structural rigidity to lift truck 100 during normal operation and also to protect lift truck 100 from damage during collisions with foreign objects (e.g., other lift trucks, parts of the warehouse, etc.). Frame 120 has an internal rigid structure that can be made of any suitable material (e.g., steel, aluminum, fiber composites, etc.) as well as a plurality of external panels that cover some, a majority, and/or all of the internal rigid structure. A battery compartment 124 is located within frame 120. A battery (see, e.g., 124B, FIG. 5) or other suitable power source is located inside of battery compartment 124. In addition to or instead of being battery-powered, lift truck 100 may be powered by, for example, a combustion engine, a hydrogen fuel cell, any other suitable type of power generating device, or any combination thereof. The battery of lift truck 100 may be of any suitable type and chemistry, including, for example, Lithium Ion (Li-Ion), Lithium Polymer (LiPo), nickel-metal hydride (NiMH), lead acid, and the like.

Lift truck has a plurality of emergency stops 122 disposed on and about frame 120. Any suitable number of emergency stops 122 may be used. In the instant embodiment, lift truck 100 has four emergency stops 122, two of which are located at a front part of frame 120, and the other two of which are located respectively on the lateral sides of frame 120 to be accessed at either side of lift truck 100. The position of emergency stops 122 may be selected based on safety regulations governing the use of autonomous vehicles in a given industry.

Emergency stops 122 are push button actuators that, when actuated, send an emergency interrupt to a controller within control box 180 of lift truck 100 to immediately stop operation of lift truck 100. In some embodiments, emergency stops 122 may have a protective collar to prevent accidental activation and may also have a timer requiring activation for a preset period of time (e.g., 1 second) in order to prevent the emergency interrupt from being generated by an unintentional activation of emergency stops 122. In other embodiments, emergency stops 122 are devoid of any such protective collar structure, so that emergency stops 122 can be activated easily with minimal effort. Only one of emergency stops 122 needs to be activated for the emergency interrupt to be generated, stopping operation of lift truck 100. Operation of lift truck 100 may resume by local assessment of the operational conditions that caused one or more of emergency stops 122 to be activated, at which point the emergency interrupt can be deactivated and normal operation can resume. In some embodiments, the assessment of the operational conditions that caused one or more of emergency stops 122 to be activated can be evaluated remotely, such that normal operation can resume without requiring a human operator to travel to lift truck 100. Lift truck 100 may also, in some embodiments, be equipped with onboard sensors that are configured to detect impact forces or other abnormal vehicle characteristics during operation and may generate a warning message and/or halt operation of lift truck 100 pending evaluation by lift truck technicians.

On one or both lateral sides of frame 122, in addition to one of the four emergency stops 122 are a display 140, a reset button 142, and a Manual control port 144. Display 140 is a touchscreen device presenting a graphical user interface (GUI) for navigating a set of menus to personnel at display 140, but a non-touchscreen display can be used as needed, along with associated controls for navigating GUI presented on such a non-touchscreen display. Reset button 142 can be used for multiple purposes, including returning lift truck 100 to normal operating mode after activation of one or more emergency stop 122, resetting an error reported by lift truck 100, clearing a memory of lift truck 100, and the like. Manual control port 144 can be configured to be accessed via a proprietary interface or any other suitable I/O interface, such as, for example, universal serial bus (USB), Ethernet®, serial port, and the like. In some embodiments, a wireless antenna may be used for local manual operation of lift truck 100. Some examples of suitable wireless protocols include Wi-Fi®, Bluetooth®; RFID, NFC, and the like.

Lift truck 100 has one or more sensors that are configured to aid in navigation and obstacle detection and aversion. Lift truck 100 has two safety scanners 126 at the forward travel side of frame 120. Safety scanners 126 can be located at or adjacent to the edge of frame 120, but any suitable position where few visual obstacles (e.g., wheels 130, mast 150 in a very low position, debris hanging from an underside of frame 122, etc.) will be present during normal use of lift truck 100. In this embodiment, safety scanners 126 are located on a bottom of frame 120 to be adjacent to the ground. Safety scanners 126 have a laser that spins around an angle of 360° to detect both presence of an object as well as the distance from the object detected. In some such embodiments, the laser within safety scanners 126 are each configured to only detect objects within 270° of the total 360° angle of rotation of the laser. In some embodiments; the laser within safety scanners 126 are configured to spin around an angle of less than 360° (e.g., 270°, 180°, 90°, or any angular rotation range suitable for a particular embodiment and placement of a safety scanner 126. In still other embodiments, one or more safety scanners 126 can have a different range of angular rotation for the laser within the one or more safety scanners 126 from others of the safety scanners 126. In yet other embodiments, the laser within each safety scanner 126 is configured to have a range of angular rotation different from each other safety scanner 126 on or associated with lift truck 100. Any other suitable technology can be used that is capable of detecting an object and determining a distance from such detected objects. Non-limiting examples of other such suitable types of sensors suitable for use as a safety scanner 126 includes sonar sensors, physical bumpers, and time-of-flight laser sensors.

By precisely knowing the location of each safety scanner 126, which are fixedly mounted to frame 120 of lift truck 100 is able to stop to avoid a collision with the object. Safety scanners 126 and/or a navigation sensor 128, discussed further hereinbelow, are also configured to identify an unobstructed transit path for lift truck 100 to navigate around the object; the transit path can be updated in real time (e.g., to account for further movement of the detected object relative to lift truck 100). In order to provide optimal object detection functionality, it is advantageous for safety scanners 126 to be located as close as practicable to the edge of frame 120 for which each safety sensor 126 is configured to detect objects. In some embodiments, one or more safety sensors 126 may be provided at a position at the rear of frame 120, so that objects can be detected during reverse movement of lift truck 100 during movement of lift truck 100 to align pole 110 with a core of a carpet roll, as well as during insertion of pole 110 within the core of the carpet roll.

Lift truck 100 also has a navigation sensor 128. Navigation sensor 128 is located on an upper surface of lift truck 100 to provide a substantially unimpeded field of vision (e.g., greater than 90% of the field of vision is unobstructed), but any suitable mounting position on lift truck 100 can be selected. In this embodiment, navigation sensor 128 uses a laser that rotates fully around 360°. The angle from 0° of lift truck is known, and the angle of each of a plurality of navigation buoys (e.g., reflectors 510 in FIG. 7) distributed throughout the operational environment (e.g., warehouse 500 in FIG. 7) in which lift truck 100 operates is known. The positions of the navigation buoys are known and navigation sensor 128 is configured to precisely determine the position of lift truck 100 within the operational environment. In some embodiments, the x-y position of lift truck 100 within its operational environment can be determined to within, for example, 10 millimeters (mm). It is advantageous to have such precision in order to enable accurate engagement of pole 110 with the core of a carpet roll as well as to avoid collisions with fixed structures (e.g., carpet racks 300 in warehouse 500, see FIG. 7) in the operational environment.

Lift truck 100 has a mast 150 configured to move pole 110 vertically and laterally (e.g., horizontally, perpendicular to a direction of extension of pole 110) in order to align pole 110 with a core of a carpet roll being retrieved. The vertical position of mast 150 is measured and detected by a vertical position sensor, such as a rotary mast height encoder 152, such as a wire-draw encoder configured to measure a linear value (here, vertical displacement of mast 150) based on the extension and retraction of a wire as mast 150 moves vertically. Mast height encoder 152 is configured to measure a vertical position of mast 150. In some aspects, mast height encoder 152 is configured to measure a relative vertical movement (e.g., from a first position to a second position) of mast 150, but does not measure the actual height of mast 150. In other aspects, vertical sensor may be a distance measuring device attached to mast 150 and oriented to measure a vertical distance of mast 150 to the surface on which lift truck 100 is being operated (e.g., a warehouse floor).

Mast 150 is also configured to tilt (e.g., "pitch") up and down in the vertical plane over a defined range of motion (e.g., +/−10°, +/−15°, or +/−20°). This tilting allows lift truck 100 to angle the carpet roll up once pole 150 is sufficiently engaged with the core of the carpet roll so the carpet roll does not slide off during transit from normal vibrations and movements exerted on or generated by lift truck 100 during transit, which could otherwise cause pole 110 to deflect downward, at least temporarily, to such a degree that the carpet roll could slide, at least partially, off of pole 110 during transit. Examples of when pole 110 might flex downward during transit include lift truck 100 passing over an uneven ground surface, a rough ground surface, normal and/or emergency acceleration, normal and/or emergency braking during transit, and the like. The angular position of mast 150 is measured by a mast tilt sensor 154. In this embodiment, mast tilt sensor is a linear transducer that measures the position and movement of a linear object attached to mast 150 through the transducer. In some such embodiments, an inclination sensor is used in addition to or instead of mast tilt sensor 154 to measure mast tilt. Other mast tilt sensors may be used, including, for example, a gyroscope, an accelerometer, a distance sensor, and the like. The position of mast 150, as determined by mast tilt sensor 154 may be used by a controller in control box 180 in order to provide a warning message and/or to stop lift truck 100 from executing an unsafe maneuver.

Lift truck 100 also has a plurality of imaging devices, including a 3D camera 160, a first line scanner 162, a second line scanner 164, a camera 166, and a pole camera 112. Each of imaging devices may be configured to detect visible light, infrared light, a combination thereof, or any other suitable light wavelength. 3D camera 160, first and second line scanners 162 and 164, and camera 166 can be duplicated on both sides of lift truck, as, for example, a mirror image with respect to a vertical plane defined along the direction of extension of pole 110. It is advantageous for 3D camera 160, first and second line scanners 162 and 164, and camera 166 to be configured to detect infrared light, either in addition to or in place of visible light, so that lift truck can be operated in a dark or dimly lit environment and also so that visible lights that would otherwise be mounted to lift truck 100 do not interfere with or pose a hazard to other employees working in areas where lift truck 100 is operated. In order to use infrared imaging device, lift truck 100 has one or more infrared light sources that are respectively oriented to point towards the side(s) and/or rear of lift truck 100 (e.g., towards the side of lift truck 100 with pole 110). Pole camera 112 is located at the distal end of pole 110 and will be discussed further with respect to FIG. 10B 3D camera 160 is oriented perpendicular to the direction of forward and rear travel of lift truck 100 (e.g., to the side). 3D camera 160 can be any range imaging device configured to provide a three dimensional array of data, with each cell in the array containing the distance from the lens of 3D camera 160 to an object, as well as the horizontal and vertical coordinates of the cell in the field of view of 3D camera 160. Stated differently, 3D camera 160 is configured to generate a 3D image as a point cloud having a plurality of data points in three-dimensional space. Several technologies available to perform this function, including dual offset cameras. Data from 3D camera 160 can be interpreted to determine features that are useful to provide information about presence/absence of objects in three-dimensional space as lift truck 100 moves along the ground. 3D camera 160 is shown being attached on a lateral side of mast 150, positioned to point substantially perpendicularly to the forward/reverse directions of travel of lift truck 100. This arrangement on mast 150 allows for mast 150 to be raised so that 3D positional data can be obtained at multiple vertical positions (e.g., on different shelves of racks in a warehouse).

In some embodiments, first and second line scanners 162 and 164 are attached to mast 150 so as to point in the same direction as 3D camera 160 (e.g., perpendicular to the direction of travel of lift truck 100). First and second line scanners 162 and 164 are oriented perpendicular to each other, so that first line scanner 162 can be oriented to scan in a substantially vertical plane, while second line scanner 164 can be oriented to scan in a substantially horizontal plane. Through this arrangement, with first line scanner 162 being oriented in a vertical plane, the surroundings of lift truck 100 (e.g., contents of a warehouse) can be detected and mapped by the forward movement of lift truck 100 through the warehouse. Similarly, by raising mast 150, second line scanner 164 can be used to generate a point cloud and calculate the diameter (e.g.; the widest horizontal distance) of an object (e.g., a roll of carpet) based on the known optical characteristics of second line scanner 164.

Camera 166 is mounted to mast 150 and oriented to point towards the side of lift truck 100, substantially perpendicular to the forward/reverse directions of travel for lift truck 100. While any optical camera may be used for camera 166, it is advantageous for camera 166 to be configured to detect infrared light so that lift truck 100 can be operated in low light environments. Because a carpet roll will fluoresce under infrared light but the hole at the empty space within the core of the carpet roll will not fluoresce, using an infrared device for camera 166 provides enhanced detection capabilities of the precise location of the carpet roll, so that lift truck 100 can precisely navigate to horizontally align pole 110 with the carpet roll. It is also possible to determine the width of an object using an image from camera 166. Knowing the optical characteristics (e.g., focal length, aspect ratio, etc.) of camera 166, the widest point of an object may be determined using pixilation. Furthermore, camera 166 may be configured to detect a label (e.g., 330, FIG. 10B) affixed to an end of the carpet rolls as lift truck 100 moves along the transit path.

Lift truck 100 has pole 110 mounted to mast 150 by carrier 158. Pole 150 has an outer cross-sectional profile (e.g., circular) configured to be inserted within a longitudinal cavity (e.g., a hollow cylindrical core) of the object (e.g., a carpet roll) being manipulated. While pole 110 may have a cross-sectional profile that is different, either in shape, size, or otherwise, than the cross-sectional shape of the core of the object being accessed, pole 110 shown in this embodiment has a circular cross-sectional hole and is configured to be inserted concentrically within a core with a circular cross-sectional shape, such as are used in assembling carpet rolls for transport and storage. Pole 110 has a length that is long enough to securely transport the carpet roll without the carpet roll being dislodged by normal vibrations experienced during transit. In some embodiments, pole 110 has a length that is substantially identical to the length of the carpet roll. Pole 110 has a cross-sectional diameter (e.g., width) that is smaller than the diameter of the core of the carpet roll into which pole 110 will be inserted during use In FIG. 1B, a rear view (e.g., reverse the direction of forward travel) of lift truck 100 is shown. In this view, a key switch 131, an emergency stop 122, and a power switch 133 are shown on the left (as shown in FIG. 1B) lateral side of frame 120 that is hidden in FIG. 1A. Key switch 131 is used to limit operation of lift truck to authorized users (e.g., personnel with a key to activate key switch 131). Key switch 131 could be replaced with any other suitable access authorization scheme (e.g., badge access, RFID, Bluetooth®, NFC, etc.). Power switch 133 is a push button configured to allow lift truck 100 to be turned on once user authorization has been verified (e.g., by inserting a compatible key in key switch 131). Without the authorization of a user being verified, power switch 133 is disabled.

In some embodiments, lift truck 100 has a power switch 133 that is configured to disconnect battery 124B (see, e.g., FIG. 5) and a key switch 131. In some such embodiments where a current spike rating of the power distributor (e.g., 414, see FIG. 5) exceeds the rated current limit for key switch 131, key switch 131 is connected to and/or configured to control a flow of power through a first electrical contactor configured to control power to the power distributor. This first electrical contactor is configured, when transmitting electrical energy, to provide a conduction path for power to a logic controller (e.g., 430, FIG. 5), preferably through the power distributor so that a voltage of the power is regulated. Logic controller is configured as a central point of the control circuitry of lift truck 100 configured to disable power to every other electrical device, as needed, using a second electrical contactor connected to an output of the logic controller. This second electrical contactor is thus configured to control a flow of power to all of the other electronic components in lift truck 100.

Mast 150 is shown in greater detail in FIG. 1B as well. It can be seen that mast 150 has a pair of vertically oriented tracks 156 on which a carrier, generally designated 158, is located so as to be configured for vertical movement via, e.g., a rack-and-pinion engagement between tracks 156 and carrier 158. In some embodiments, mast 150 has a set of "nesting" telescoping members configured as tracks 156 that allow for multiple stages (e.g., three stages) of vertical movement. Carrier 158 is also configured for lateral movement relative to tracks 156 by actuation of lateral actuators (e.g., cylinders that are pneumatically, hydraulically, or electrically activated) 172, which can be interposed between tracks 156 and carrier 158 so as to enable lateral (e.g., horizontal) displacement of carrier 158 relative to tracks 156. Pole 110 is mounted substantially in the center of carrier 158. A distance scanner 168 is disposed at a fixed position adjacent to pole 110, oriented to point along the length of pole 110. As shown, distance scanner 168 is vertically mounted to carrier 158 above the position where pole 110 is mounted. Distance scanner 168 is shown as a TIM line scanner. Distance scanner 168 is configured to detect a distance from the base of pole 110 to objects located within the field of vision of distance scanner 168, such as immediately in front of pole 110. Pole camera 112 is located at the end of pole 110. In order to protect pole camera 112 from damage during insertion of pole 110 into a core of a carpet roll, it is advantageous to surround pole camera 112 with a protective ring or cover, at least in part. A control box 180 is located on carrier 158 to move with carrier 158. Control box 180 is configured as a remote power distribution and communications bus and is connected to power from battery of lift truck 100 by, for example, a flexible cord arrangement between lift truck 100 and carrier 158. Control box contains automation controllers, vehicle controllers, logic controllers, and the like (see, e.g., FIG. 5).

In some embodiments, lift truck 100 is configured to monitor its operational health parameters, including, for example, a charge state of its internal battery, tire pressure, fluid temperatures and pressures, particulate and/or contamination level of any fluids present in lift truck 100, and the amount of time before a service interval is exceeded. In some such embodiments, lift truck 100 is configured to enter a maintenance mode until such operational health parameters identified as needing attention are adequately addressed. For example, if a low battery charge state is detected, lift truck 100 is configured to proceed to a charging station or, where the battery is removable, to a station where a technician can replace the battery with a fully charged battery so that lift truck 100 is able to continue operations with a replacement battery instead of waiting until its battery is charged before resuming normal operating mode. Similarly, where an overpressure or overtemperature condition is recorded, lift truck 100 is configured to stop operating until a service technician has inspected lift truck 100 and performed any maintenance needed to remedy this situation. Depending on the operational health parameter identified, lift truck 100 may display an alert or error message on display 140 and also to a human operator (see, e.g., FIG. 6).

Figure 2:
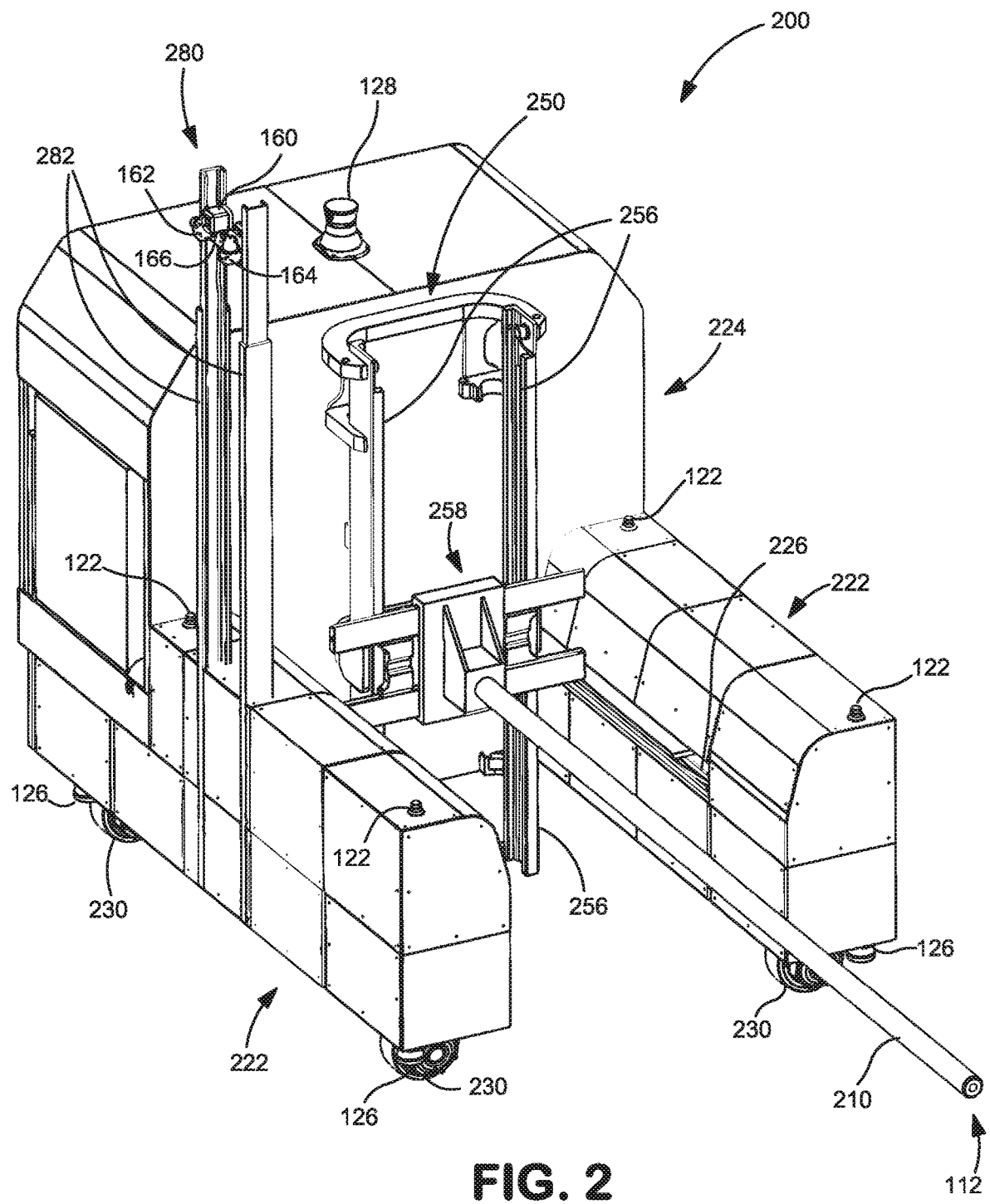
FIG. 2 shows a second example embodiment of a lift truck configured for autonomous storage and retrieval of carpet rolls, in accordance with the disclosure herein.

Referring now to FIG. 2, a second embodiment of a lift truck, generally designated 200, is shown. Lift truck 200 has some similarities to lift truck 100; where such similarities exist, they will not be explained again fully herein. Lift truck 200 has a frame, generally designated 220, that is U-shaped, as viewed from above. Frame 220 thus has two lateral portions 222 that are connected at the front edges thereof by a front portion 224 of frame 220. Side portions 222 each have a shelf portion 222A that is a slanted or horizontal section that oriented along the length of each side portion 222. Shelf portion 222A is configured to support a carpet roll, at least partially, during transport, so that pole 210 does not support all of the mass of the carpet roll during transport. In some embodiments, rails may be provided extending from an inner surface of side portions 222 in lieu of shelf portions 222A, such that these rails would be configured to support a carpet roll, at least partially, during transport. In order to ensure sufficient structural rigidity to avoid lateral deformation (e.g., a splaying apart movement) of side portions 222 during transport, a cross member may be used to join side portions 222 of frame 220. In some embodiments, frame 220 is supported and laterally strengthened by, for example, a floor plate connecting both lateral portions 222. Such a floor plate could be configured to prevent hanging fibers from a carpet roll from contacting the floor of the warehouse during transit. Additionally, each of side portions 222 and front portion 224 can be resized as needed. Further, frame 220 may have a shape other than that of a "U" shape and may in fact be any suitable shape, as will be understood by those having ordinary skill in the art.

Lift truck 200 has four independently controlled wheels 230. Wheels 230 are each configured for steering and providing a locomotive force. There are two motors on each wheel 230. A steering motor controls the direction of the wheels for steering and a locomotion motor controls the locomotive force applied to the wheel. One drive is required for each motor, totaling four drives for the locomotion motors and four drives for the steering motors. One wheel 230 is located at each of the corners of lift truck 200, with one wheel 230 at the rear sides of each of the lateral portions 222 and two wheels 230 located under front portion 224. For the wheels 230 under front portion 224, one wheel 230 is located adjacent to each of the lateral sides of front portion 224.

Also, lift truck 200 has a mast 250 that is inset within the outer perimeter of frame 220 of lift truck 200. Mast 250 is configured to move pole vertically and/or horizontally, as was described previously for lift truck 100, and is also configured for linear displacement in the direction parallel to the length of pole 210, so that pole 210 can be extended and retracted relative to the perimeter of frame 220. This extension and retraction movement is enabled by mast 250 being movable along a track 226 formed along the length of the respective inside surfaces of side portions 222 of frame 220. Just as was described relative to lift truck 100, pole 210 is movably attached to mast 250 by a carrier 258, on which pole 210 is fixedly attached. In some embodiments, the fixed attachment of pole 210 to carrier 258 can be detachable (e.g., by unscrewing bolts). In some embodiments, lift truck 200 may have side shifting actuators (e.g., hydraulic cylinders) that are configured to move carrier 258 laterally relative to mast 250. In some embodiments, such as where each of wheels 230 is configured to steer lift truck 200, mast 250 may only be configured to move pole 210 vertically and axially (e.g., in the direction of extension of pole 210), since lift truck 200 may be moved laterally to align pole 210 with a core of a carpet roll.

As such, when lift truck 200 determines that pole 210 is correctly aligned with the core of a carpet roll, pole 210 and mast 250 move together as a unit along track 226 towards the carpet roll, rather than the entire lift truck 200. The position of mast 250 along track 226 is measured by a position sensor 252, which can include a distance measurement unit, a linear position transducer, and the like.

This retractable arrangement of mast 250 and pole 210 relative to frame 220 provides several advantages. For example, the accuracy and precision of the movement of pole 210 is increased significantly, as, unlike in lift truck 100, where the entire lift truck 100 moves during insertion of pole 210, only mast 250 and pole 210 move along track 226 during the engagement of pole 210 with the core of a carpet roll; this allows for less moving parts and lower vibration, because the wheels of lift truck 200 do not need to travel over a floor surface, which can impart vibration to pole 210, which is cantilevered from mast 250. Also, when mast 250 is fully extended, frame 220 acts as an enhanced counterweight, allowing for pole 210 to be inserted into a carpet roll on a ground surface and lifted vertically by mast 250 before mast 250 and pole 210 are retracted within frame 220 of lift truck 200 to a retracted position (e.g., a transit position). Furthermore, because mast 250 and pole 210 are capable of being retracted within the perimeter of frame 220, the length of lift truck 200 may be shorter than lift truck 100, enabling lift truck 200 to be operated more safely, as the majority, a supermajority (e.g., 75% or more), substantially all (e.g., 90% or more), or all of pole 210 and/or a carpet roll on pole 210 are retracted within frame 220 during transit of lift truck 200 along a transit path, significantly reducing the risk of an impact of pole 210 with a foreign object and enhancing the operational safety of lift truck 200. In some embodiments, pole 210 is shorter than, substantially a same length as (e.g., +/−10%), or longer than the carpet rolls to be transported by lift truck 100. Because pole 210 can be retracted within the perimeter of frame 220 of lift truck 200, as well as the inclusion of safety sensors 126 at the front and rear of lift truck 200, lift truck 200 is capable of operating at full speed at all times without needing to slow down (e.g., 10%, 25%, 33%, 50%, or 75% of a transit speed) when maneuvering to be positioned for carpet roll storage or retrieval.

As shown in FIG. 2, lateral portions 222 of frame 220 have a lower height than front portion 224. This enables an accessible location for a plurality of emergency stops 122 to be disposed on these lateral portions 222, as well as on the front and/or sides of front portion 224. A navigation sensor 128 is located on lift truck 200 at a position with a full field of vision around lift truck, such as the top vertical surface of front portion 200. It is preferred for navigation sensor 128 to be located vertically above the minimum height of mast 250, so mast 250 does not block any significant portion of the field of vision of navigation sensor 128. Lift truck 200 further has a plurality (e.g., four) of safety scanners 126 disposed along a bottom surface adjacent to or at corners of frame 220, adjacent to each wheel 230. In some embodiments, two safety scanners 126 can be located at diametrically opposite corners of frame 220, outside of (e.g., in front/rear of and to the side of) wheels 230. In either configuration, safety scanners 126 are configured to operate similarly as was discussed relative to lift truck 100, such that safety scanners are configured to detect the position and distance of obstacles around lift truck 200 in order for lift truck 200 to determine whether these detected objects are in the projected transit path, so that further navigation waypoints can be assigned to avoid these objects.

Lift truck 200 has a substantially similar vision system to that described above for lift truck 100, including a 3D camera 160, first and second line scanners 162 and 164, camera 166, distance sensor 168, and pole camera 112. Pole camera 112 is located at the distal end of pole 210 and will be discussed further with respect to FIG. 10B. While the functionality of 3D camera 160, first and second line scanners 162 and 164, and camera 166 are substantially the same as was discussed with respect to lift truck 100, 3D camera 160, first and second line scanners 162 and 164, and camera 166 are attached to telescoping frame 280 on lift truck 200, which is configured to move the side-mounted imaging devices (e.g., 3D camera 160, first and second line scanners 162 and 164, and camera 166) vertically along one or more track arms 282. The functionality and orientation of 3D camera 160, first and second line scanners 162 and 164, and camera 166 is substantially identical in lift truck 200 as was described above for lift truck 100. In some embodiments where scanning is needed at a level (e.g., a ground level) where side portions 222 of frame 220 would block further downward movement of one or more of 3D camera 160, first and second line scanners 162 and 164, and/or camera 166, these imaging devices may be disposed on an articulating arm or otherwise made pivotable along a vertical plane, so the imaging devices can be angled downward. In other such embodiments, duplicate imaging devices can be embedded within the exterior of one or more lateral portion 222. Lift truck may have a telescoping frame 280, each with a 3D camera 160, first and second line scanners 162 and 164, and a camera 166, on each lateral side of frame 220, so as to be pointed perpendicular to the direction of extension of pole 210.

Because wheels 230 are independently controlled, lift truck 200 is configured for scanning of shelves to detect and identify carpet rolls stored thereon when pole 210 is pointed towards the shelves as well as when lift truck is oriented parallel to the shelves. This can be seen in FIG. 7, which is a schematic illustration of lift trucks 100/200 within a warehouse, generally designated 500, with carpet racks, generally designated 300, installed therein, with aisles, generally designated 340, being defined between adjacent rows of carpet racks 300.

Figure 3A:
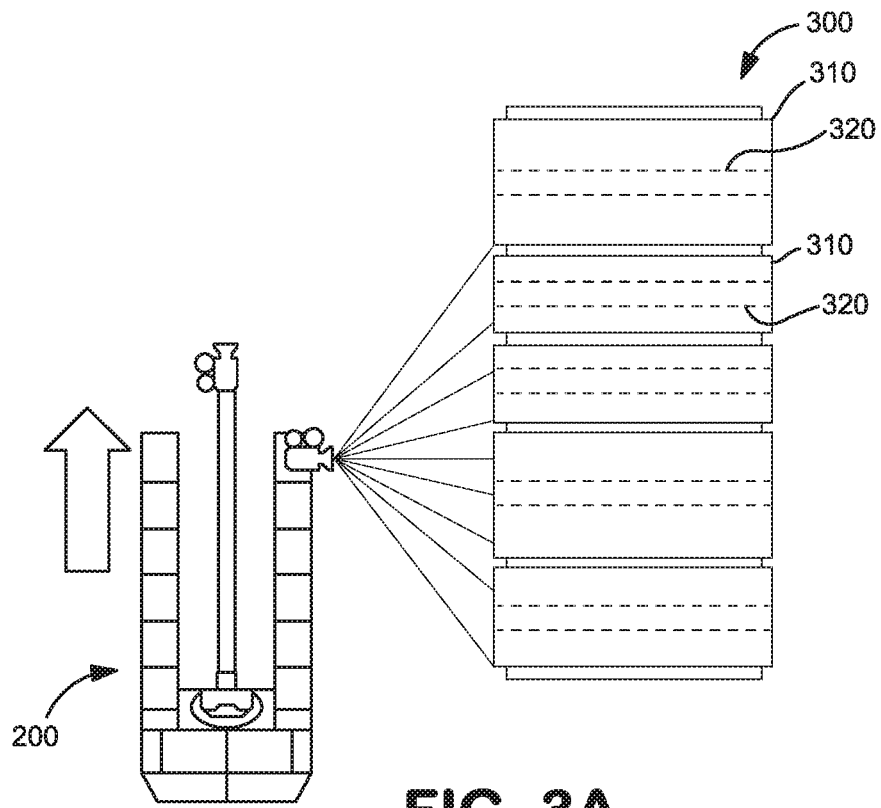
FIGS. 3A through 3H show steps for the retrieval of a carpet roll by the example embodiment of the lift truck shown in FIG. 2, in accordance with the disclosure herein.
Figure 3B:
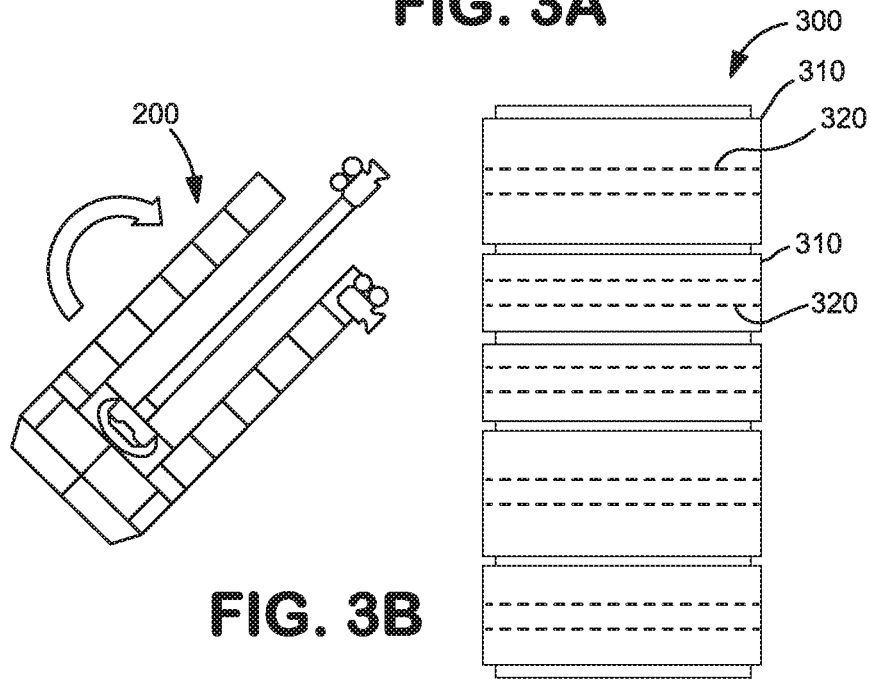

Referring now to FIGS. 3A through 3H, steps of finding and removing a carpet roll are shown using the embodiment of lift truck 200 shown and described with respect to FIG. 2. In FIG. 3A, lift truck 200 is shown moving in the forward transit direction, indicated by the arrow, and is scanning the carpet rolls on the side of lift truck 200 on which the carpet rolls are located. In some embodiments, lift truck 200 is configured to travel in the reverse direction, with pole 210 trailing lift truck 200. Once a particular carpet roll to be retrieved has been identified, lift truck 200 begins to pivot to align pole 210 with the core of the carpet roll identified by imaging systems. Because of the independent control and drive of wheels 230 (see, e.g., FIG. 2), lift truck 200 does not need to perform a multipoint turning maneuver in order to align pole 210 with the core of carpet roll, but can instead pivot while still moving forward.

Figure 3C:
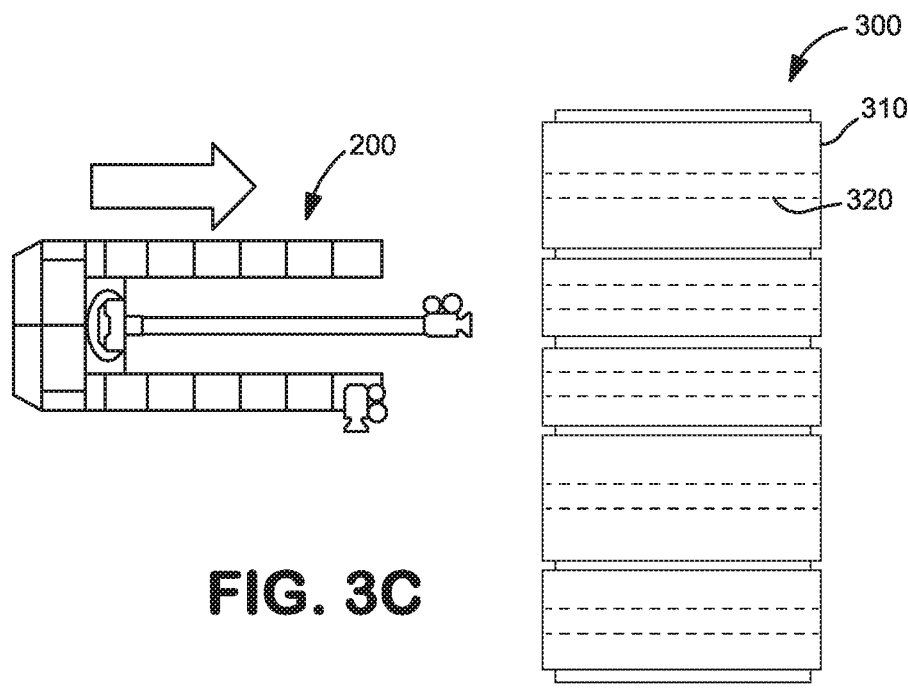
Figure 3D:
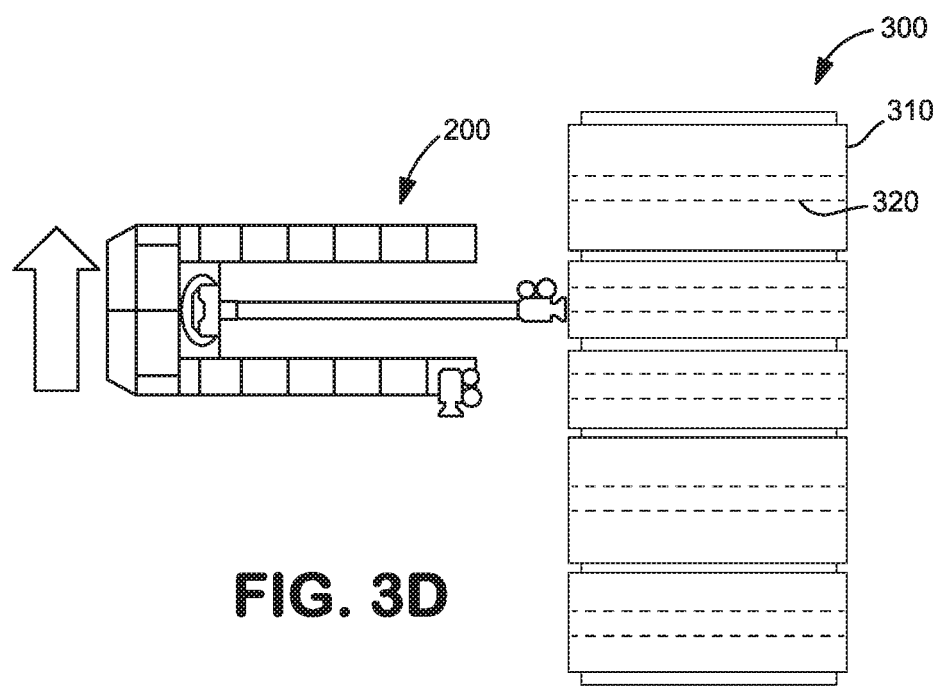
Figure 3E:
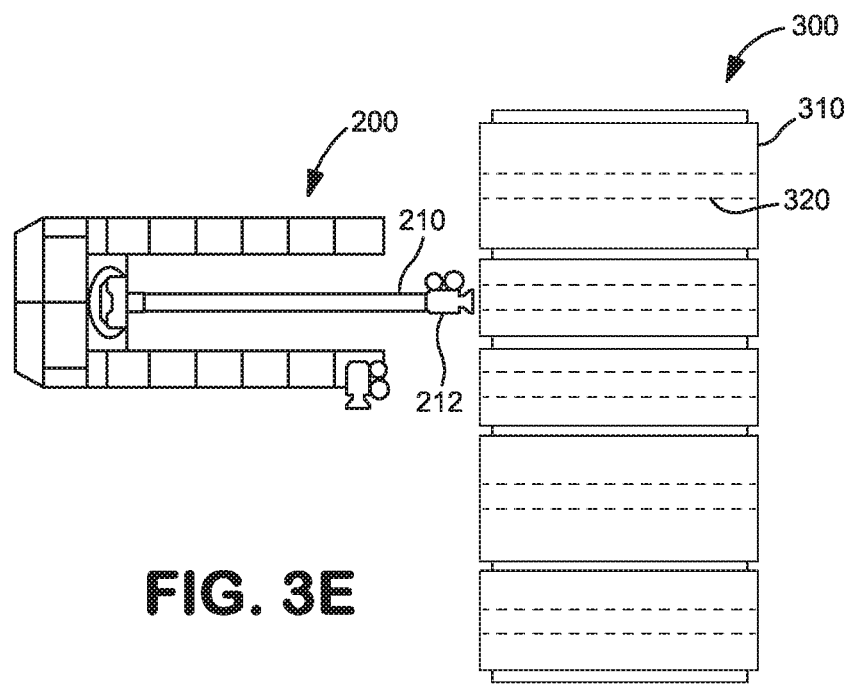
Figure 3F:
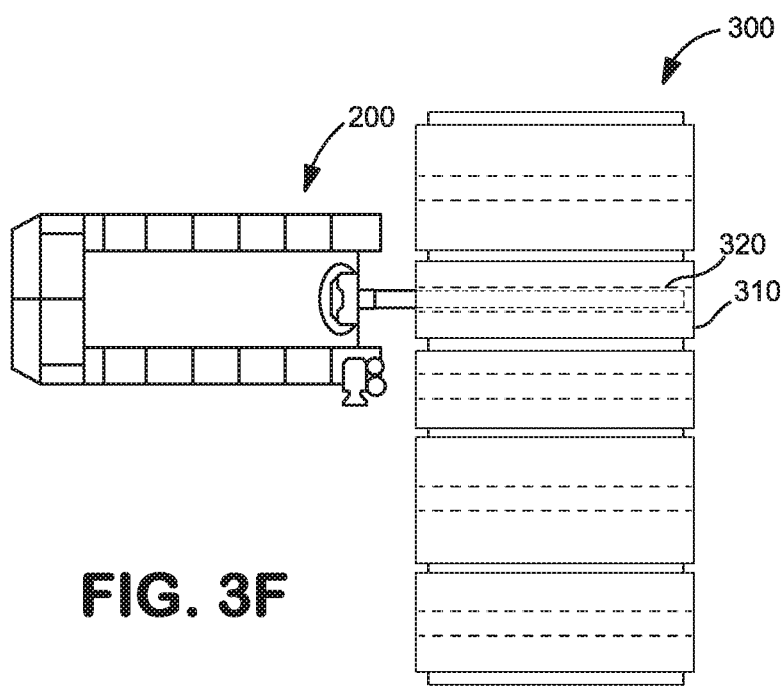
Figure 3G:
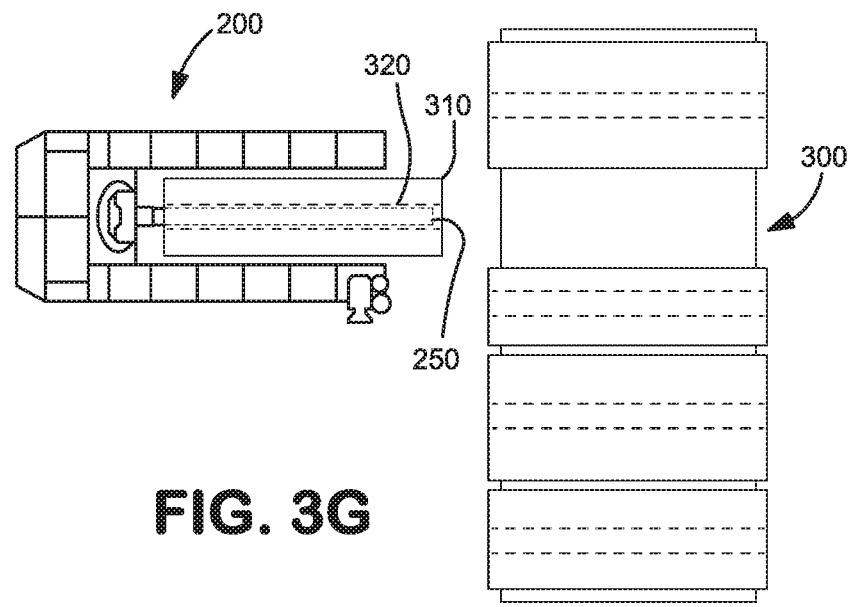
Figure 3H:
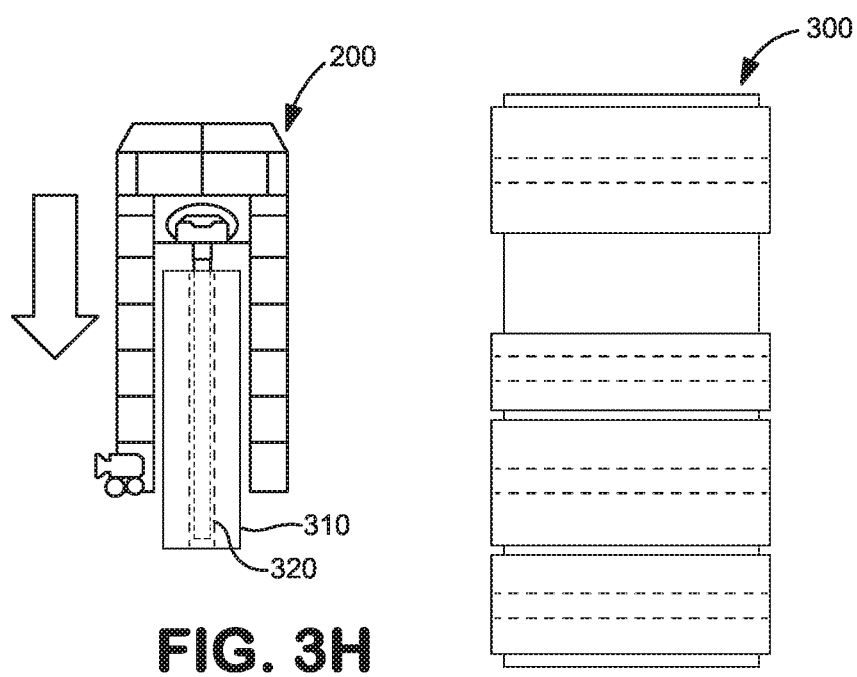

In FIG. 3C, lift truck 200 has aligned itself so that pole 210 is aligned parallel with the cores of the carpet rolls and moves forward towards the carpet roll identified to the position shown in FIG. 3D. At this point, pole camera 212 is used to identify that pole 210 is misaligned, at least in this example, with the core of the carpet roll. Because the wheels of lift truck 200 are independently driven and rotated, lift truck 200 is able to move itself laterally to align with the core of the carpet roll, as shown in FIG. 3E. As such, in some embodiments, horizontal actuators can be omitted in lift truck 200, since lift truck 200 is capable of such lateral aligning adjustment movements. Next, as shown in FIG. 3F, mast 250 moves pole 210 forward along track 226, with pole 210 moving into the core of the carpet roll. Once pole 210 is sufficiently engaged with the core of the carpet roll, mast 250 raises the carpet roll enough that carpet roll is not in contact (or not in weight-bearing contact) with the shelving and mast 250 is retracted along track 226, as shown in FIG. 3G, along with pole 210 and the carpet supported on pole 210, so that a majority of the carpet roll is stored within the frame 220 of lift truck 200. Finally, after pivoting in place, FIG. 3H shows lift truck 200 moving away from the location from which the carpet roll was retrieved, along the navigation path selected for or by lift truck 200 to reach the specified destination.

Figure 4A:
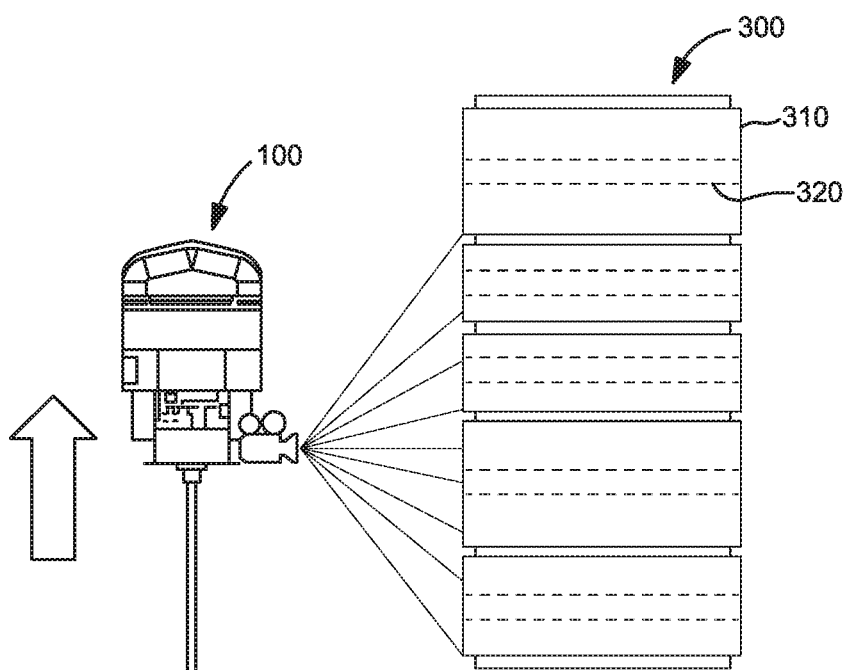
FIGS. 4A through 4G show steps for the retrieval of a carpet roll by the example embodiment of the lift truck shown in FIGS. 1A and 1B, in accordance with the disclosure herein.
Figure 4B:
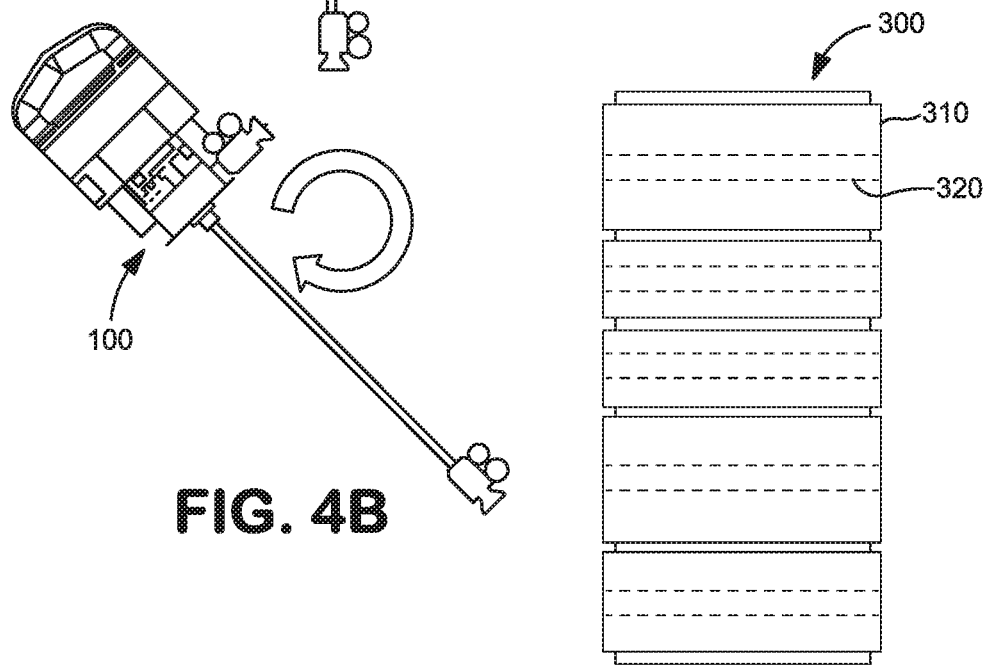
Figure 4C:
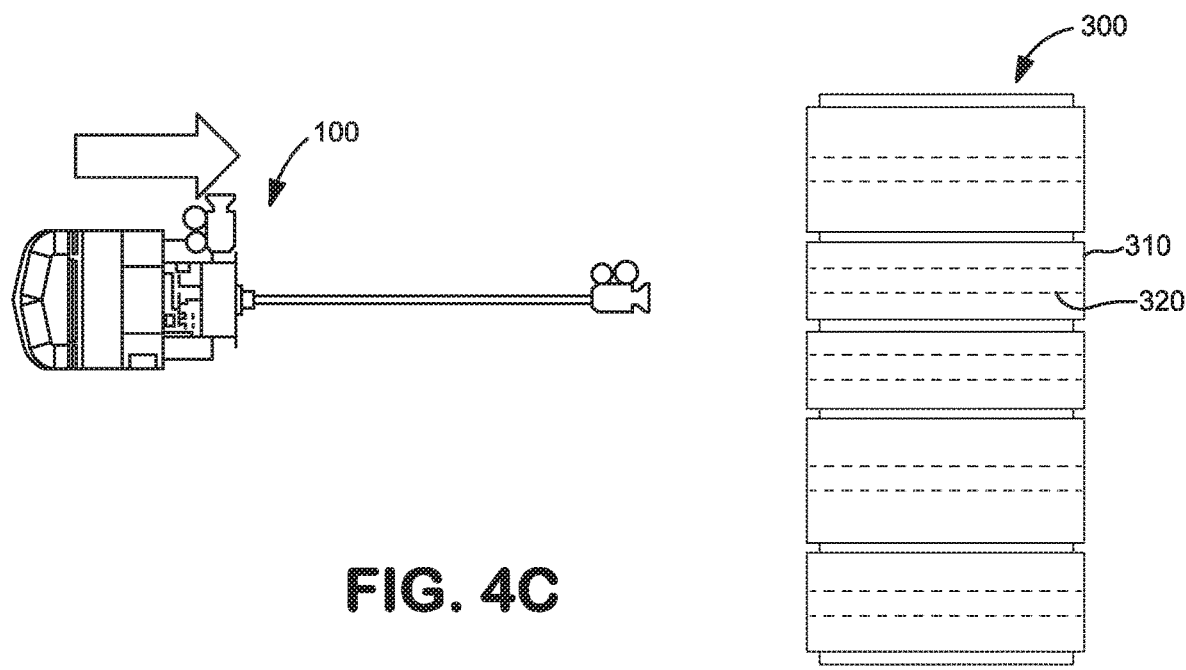
Figure 4D:
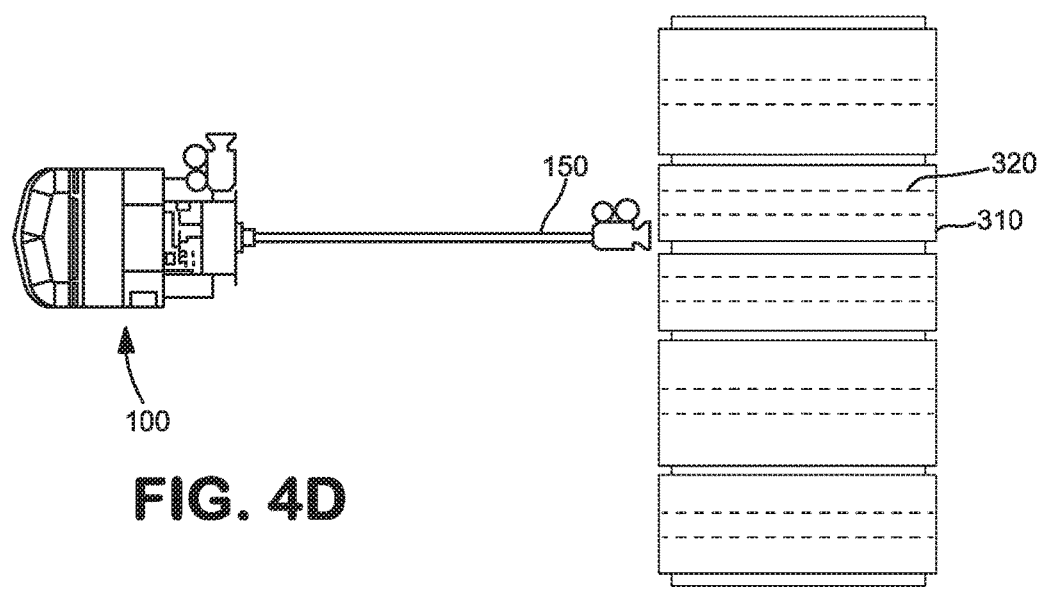
Figure 4E:
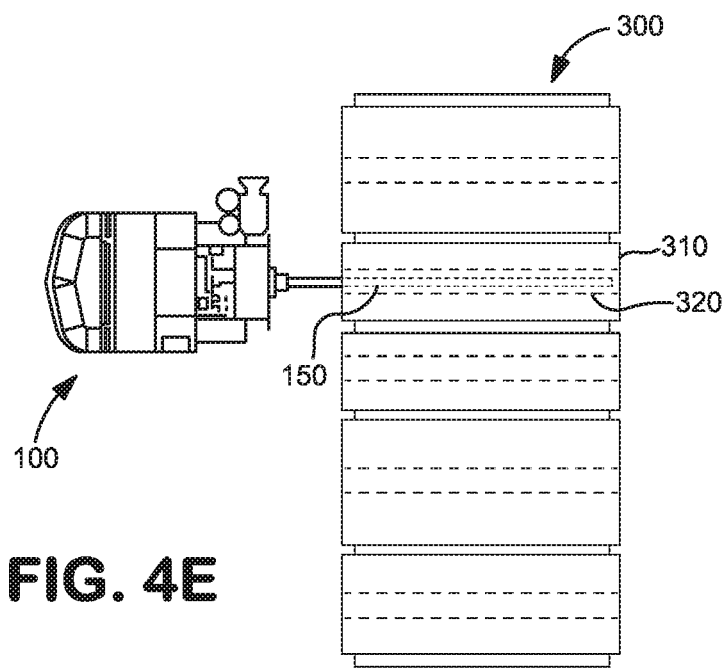
Figure 4F:
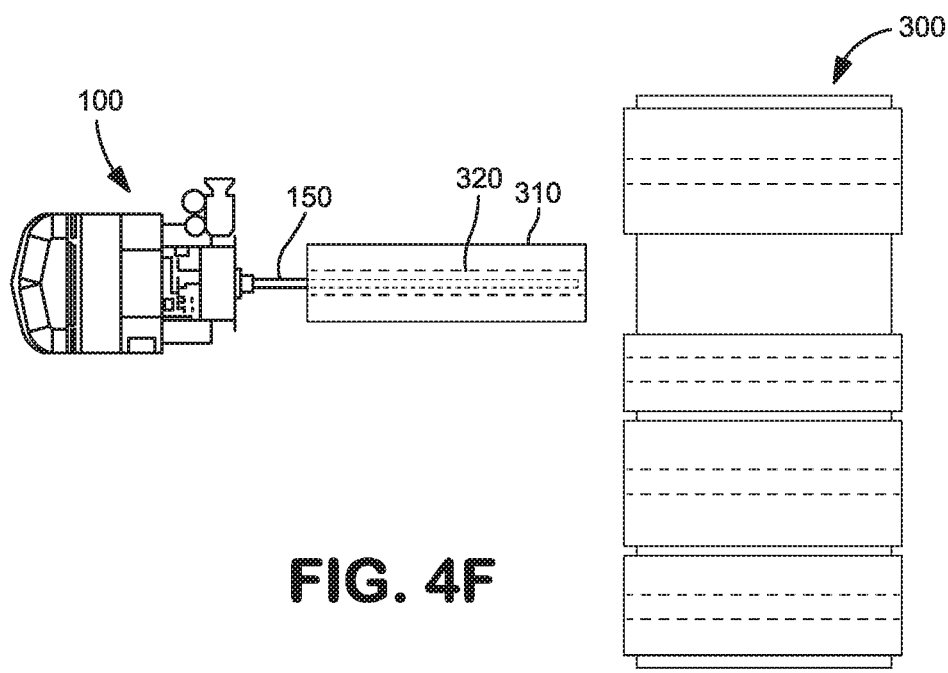
Figure 4G:
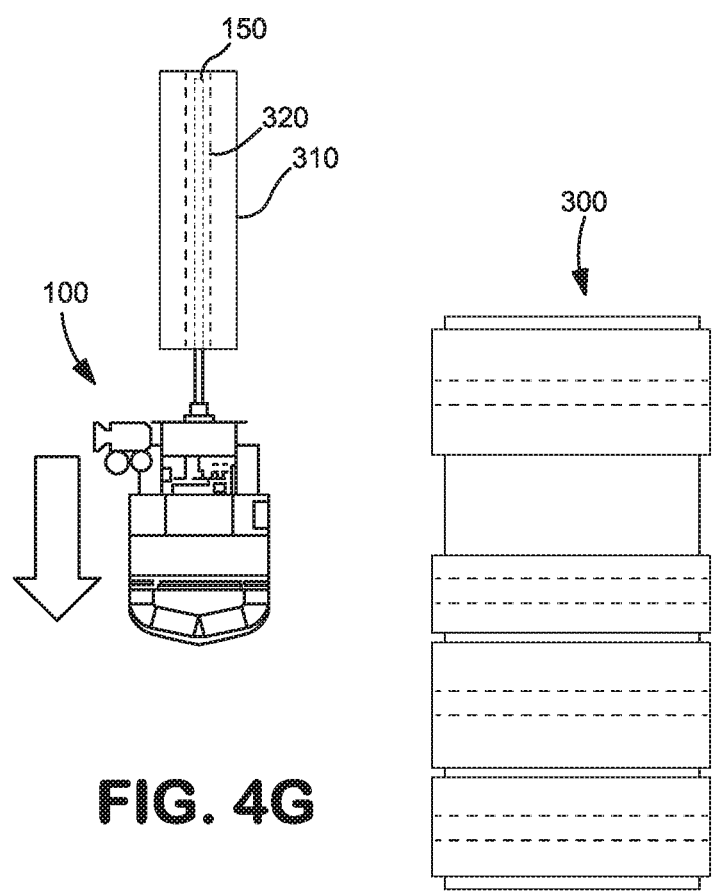

In FIGS. 4A through 4G, steps of finding and removing a carpet roll are shown using the embodiment of lift truck 100 shown and described with respect to FIGS. 1A and 1B. In FIG. 4A, lift truck 100 is traveling in the forward transit direction, with pole 110 pointed behind lift truck 100 in order to avoid impacts of pole 110 on foreign objects (e.g., other vehicles, shelving, warehouse personnel, and the like). As lift truck 100 moves, carpet rolls on shelving to the side of lift truck 100 are scanned by lift truck 100. Once a carpet roll to be retrieved is identified, lift truck 100 begins to execute a three-point turn, as shown in FIG. 4B, so that pole 110 will be aligned with the core of the carpet roll. As shown in FIG. 4C, with pole 110 aligned with the core of the carpet roll to be removed, lift truck 100 moves towards the carpet roll. FIG. 4D illustrates an example where pole 110 is misaligned, with lift truck 110 incapable of lateral adjustment movements. In such instances, the horizontal actuators on mast 150 will be used to adjust the lateral position of mast 150 to align pole 110 to the core of the carpet roll. Once aligned properly, pole 110 is inserted within the core of the carpet roll by lift truck 100 moving forward. Once pole 110 is sufficiently engaged with the core of the carpet roll, mast 150 raises the carpet roll enough that carpet roll is not in contact (or not in weight-bearing contact) with the shelving and lift truck 100 moves in reverse to extract the carpet roll from the shelving, as shown in FIG. 4F. Finally, lift truck 100 turns and moves, as shown in FIG. 4G, away from the location from which the carpet roll was retrieved, along the navigation path selected for or by lift truck 100 to reach the specified destination.

Figure 5:
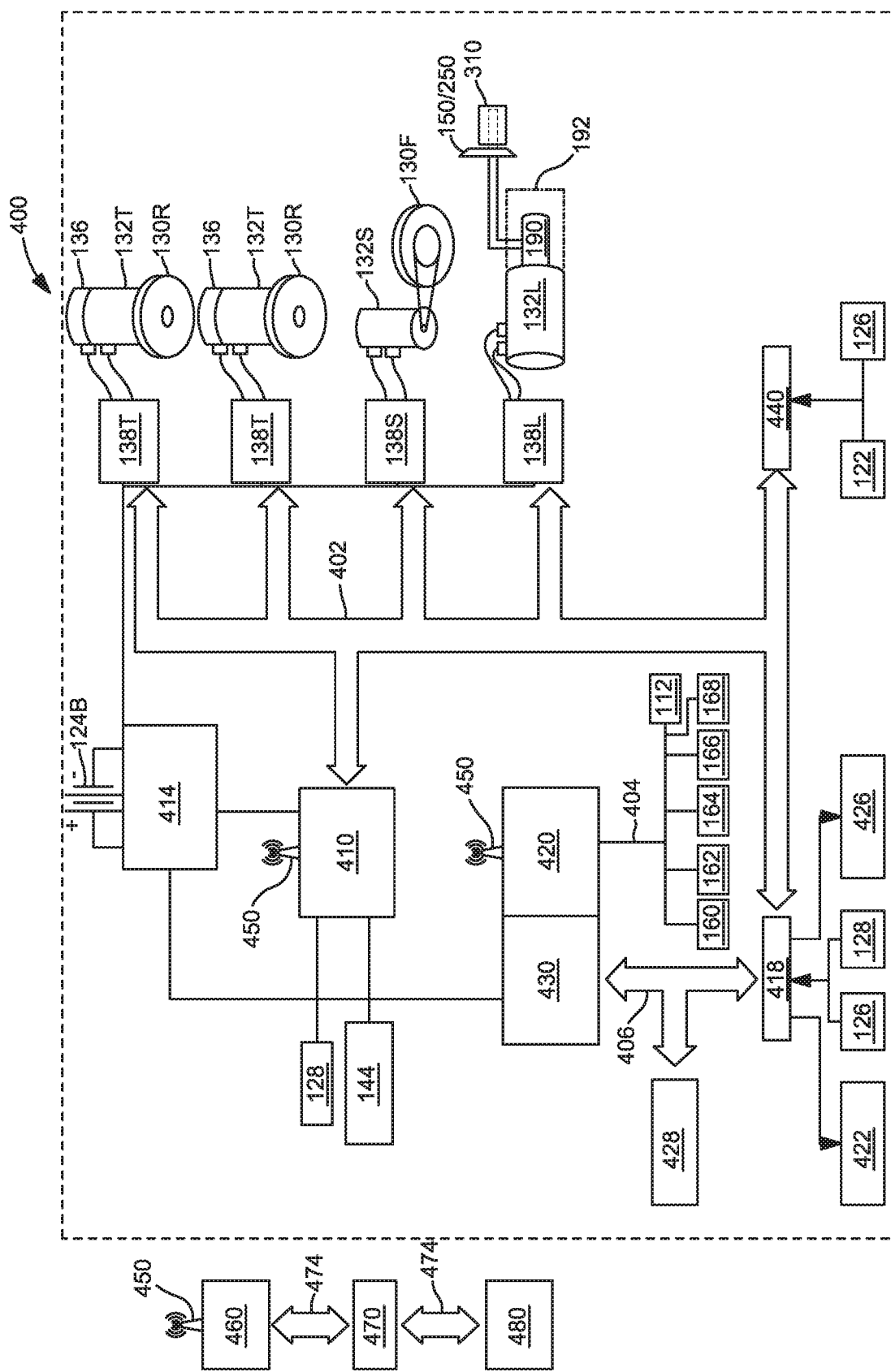
FIG. 5 is a schematic diagram of an example embodiment of a control architecture for a lift truck, in accordance with the disclosure herein.

Referring now to FIG. 5, a schematic diagram of an example embodiment of a control system, generally designated 400, onboard lift truck 100, as well as external communication paths, are shown. Control system 400 is equally applicable to lift truck 200 and may further omit or include other suitable components, such as including four wheels 230 each with independently controlled traction and steering motors, as would be understood by those having ordinary skill in the art. A power distributor 414 is housed within control box 180 (see, e.g., FIG. 1B) and is configured to provide each of a plurality of control devices on lift truck 100 to receive energy from a battery 124B. The vehicle controller 410 is a programmable logic controller (PLC) that executes a software program that responds to data received across communications bus 402 to and from navigation sensor 128 to navigate lift truck 100. Vehicle controller 410 communicates wirelessly with system manager 460, via wireless antennas 450. Vehicle controller 410 is configured to receive inputs from a manual control device connected to manual control port 144, enabling an operator to drive lift truck 100 with automatic mode disengaged and manual control mode enabled, for example by pressing a button or switch on the manual controller or by pressing a button on the GUI presented by display 140.

Vehicle controller 410 is configured to send speed commands to traction motor controllers 138T, which are converted into electrical signals to send to traction motors 132T. Each traction motor 132T has a brake 136, which is configured to stop a movement of lift truck 100 and/or as a parking brake. Traction motors 132T are attached to rear wheels 130R through a geared transmission path to output a specified wheel rotation speed.

Vehicle controller 410 is further configured to send angular commands to steer motor controller 138S, which sends corresponding commands to steer motor 1383. Steer motor 138S is configured to rotate front wheel 130F to the angle specified by vehicle controller 410. Steer motor 138S is also configured to verify that front wheel 130F is rotated to the specified angle using motor feedback.

An automation controller 420 and a logic controller 430 are a shared hardware device (e.g., a multi-core computer processor) configured to simultaneously run a computer operating system (e.g., Windows®) and a programmable logic controller 430. A portion of the processing power of this hardware device (e.g., one logical core) is used to run logic controller 430 and the majority of the processing power (e.g., three logical cores) is used to run automation controller 420. Logic controller 430 executes software to control and respond to vehicle sensors (e.g., navigation sensor 128, safety sensors 126, etc.) and data communication from vehicle controller 410 through the input/output (I/O) interface 418, which is housed within control box 180. I/O interface 418 uses data (e.g., from any of the sensors on lift truck 100, from a system manager, and/or from the execution of navigation software) to control hydraulic valves that are located between frame 120 and mast 150 in lift truck 100 in FIGS. 1A and 1B and which are configured for operating mast 150, as well as displaying vehicle indicators 422 and providing operator controls 426 in operator control room 480. When an electrical current is supplied to these valves via I/O interface 418, a solenoid is actuated and a corresponding one of the hydraulic valves is opened. Similarly, when the electrical current supply stops, the solenoid retracts and the hydraulic valve closes. Communications bus 406 is used to relay information between an operator interface 428, input/output interface 418, and logic controller 430.

Lift truck 100/200 uses at least three communication protocols for data communication, including TCP/IP, CAN, and Powerlink. TCPI/IP broadcasts information/data to all connected devices on a network and all devices receive and understand the information/data broadcast over the network. In such embodiments, each connected device has a buffer of a certain (e.g., very large) amount of bytes of data queued to be processed. When the buffer becomes full, information is lost, either because the existing information in the buffer is dumped or the new information is not stored in the buffer. A communication bus using the CAN network protocol operates such that each connected device is manually assigned a Node ID when added to the network, whether through software to program the device or by physical manipulation of the device, including, for example, dials on the connected device or applying electrical power to specific pins on the connected device. Accordingly, under the CAN bus protocol, when information/data is broadcast over the network from and/or to a connected to device, the information/data includes the Node ID of the target connected device. Additionally, a master device is present on the CAN bus and all other devices are operated as slave devices. The master device (e.g., logic controller 430) transmits a sync pulse and all slave devices respond to this sync pulse periodically (e.g., 60 ms). If a slave device fails to respond within the specified period, the CAN bus is disabled and lift truck 100 stops functioning. Furthermore, Powerlink network communication protocol is very similar to TCP/IP in functionality, but one difference is that TCP/IP sends out packets of bits while Powerlink has bitwise communication, equating to many more messages being sent of a much smaller size. The other differences are that the wiring is generally more robust because it is designed for industrial purposes and that a few of the wires are switched around at the ends relative to TCP/IP cables.

Operator interface 428 is the main source of operator interaction with the lift truck 100 directly. Logic controller 430 is configured to display appropriate information on operator interface 428 pertaining to the current operational status and to receive commands back from operator interface 428, as necessary. Examples of such information to be displayed on operator interface 428 include trends displaying battery performance, orders carried out, and other relevant historical information; diagnostics to assist in improving the performance of lift truck 100 or ensuring that all devices thereof are functioning as properly; maintenance instructions directing service personnel how to perform specific tasks and logging the identities of service personnel that have performed tasks and when (e.g., date and time) these tasks were performed; aiding in troubleshooting by assisting personnel in locating a critical issue to be resolved; manual control functions to manually control many of the components of lift truck 100/200, such as mast 150/200 or vehicle lighting; errors which describes current and past errors encountered; and a list of settings to control various operational parameters like mast movement speed, laser navigation rotation speed, maximum transit speed in a certain direction, and the like.

Logic controller 430 is configured to send speed commands as well as enable/disable commands to the hydraulic pump controller to control a movement of mast 150 in any direction. Via I/O interface 428 to vehicle controller 410 for use with lift motor controller 138L. Vehicle controller 410 relays the information to lift motor controller 138L, which sends signals to lift motor 132L. Lift motor 132L controls pump 190, which pumps fluid from a reservoir 192 to move the carpet roll 310. The pressure generated by pump 190 enables lifting of mast 150, coordinated by actuation of hydraulic valves.

Automation controller 420 communicates with pole camera 112, 3D camera 160, line scanners 162, 164, and 168, and camera 166, collectively referred to as "vision system," across a communications bus 404. The vision system is configured to capture images when commanded by automation controller 420 and return the images captured to automation controller 420. Automation controller 420 analyzes the images and relays them, via a wireless antenna 450, to a web server 470. If automation controller 420 is able to successfully analyze the images and determine the contents of the images using its executed software, then no further action is taken. However, if automation controller 420 is unable to analyze the images, then web server 470 is configured to transmit the images, along with an alert, to operator control room 480, along a network 472. Operators in operator control room 480 determine the correct course of action and send commands back to automation controller 420 through web server 470. System manager 460 is configured to communicate over a wireless network (e.g., wireless antennas 450 and wireless access nodes 452) using the TCP/IP networking protocol.

Figure 6:
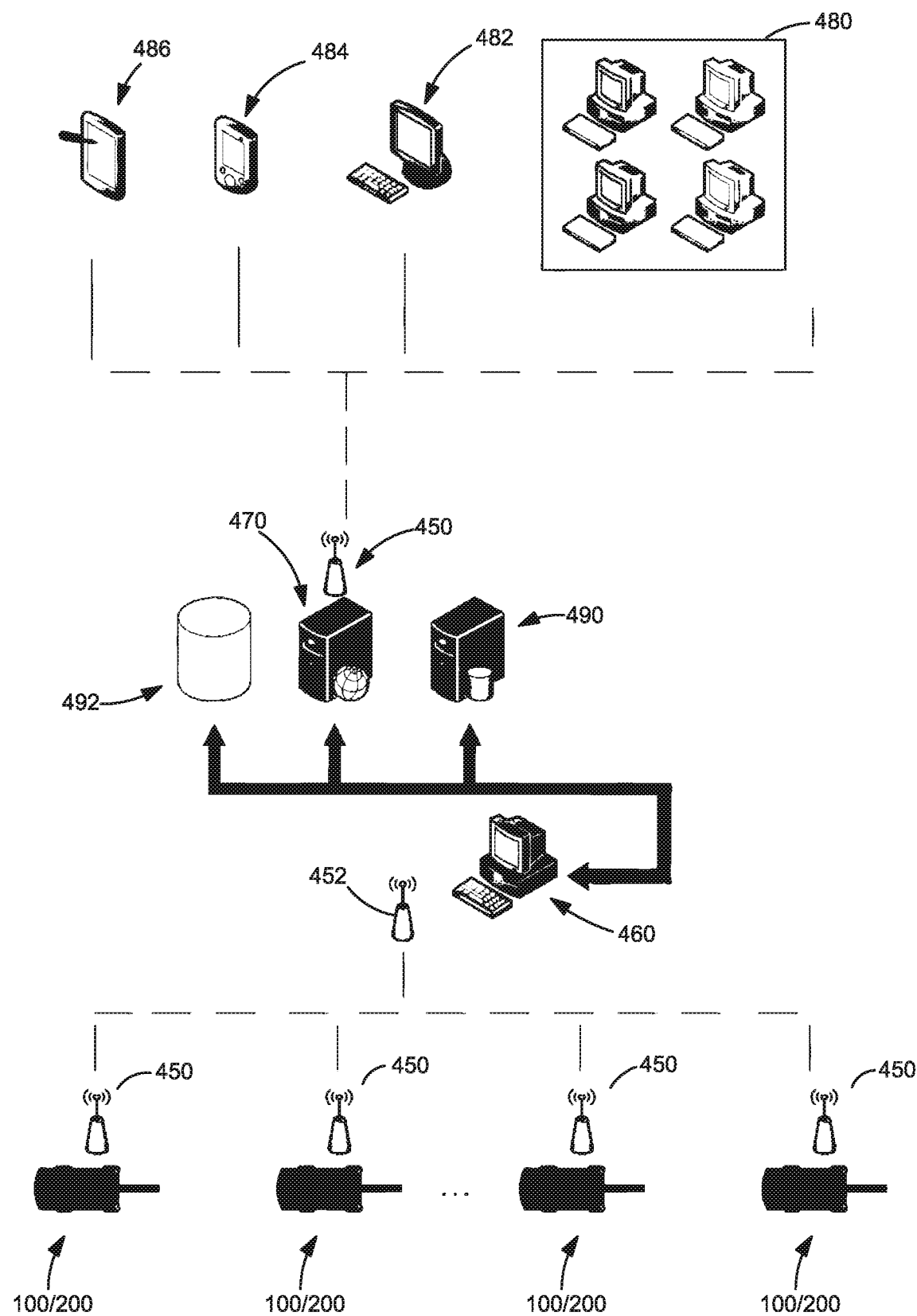
FIG. 6 is a schematic illustration of a carpet storage and retrieval system, in accordance with the disclosure herein.

Referring now to FIG. 6, a schematic illustration of a communication system for a plurality of lift trucks 100/200 is shown. In this embodiment, system manager 460 is configured to provide a set of commands (e.g, pick up a carpet roll from a location on a rack and deliver it to a loading dock location, perform inventory scanning, etc.) to one or more lift trucks 100/200 via a wireless communication node 452 to a wireless antenna 450 on a particular lift truck 100/200. System manager 460 is configured to manage some or all operations within the warehouse, including the operational status of each lift truck 100/200, a queue of tasks to be performed, a queue of alerts needing attention, the locations of each carpet roll in the warehouse, etc. System manager 460 then uses information supplied by lift trucks 100/200, an enterprise server 490, a system database 492, and web server 470 to formulate instructions for each active lift truck 100/200. Once lift truck 100/200 receives a command from system manager 460, lift truck 100/200 proceeds to the designated location to perform the designated action.

Webserver 470 is configured to communicate via the internet or other information technology (IT) network to control room 480 and to personal computing devices, including office computers 482, smartphones 484, and tablet PC's 486. For example, office computers 482 may be configured to each have a graphical display configured to show the graphical user interface of webserver 470. Webserver 470 relays situations (e.g., error conditions and/or alerts) requiring human intervention from system manager 460 to the human operators over network 472 (see, e.g., FIG. 5). In Control room 480 is configured to monitor multiple warehouses (e.g., 500, FIG. 7) simultaneously through networking protocols allowing a central operator location. Webserver 470 prompts a human operator located in control room 480 or having a smartphone 484 or a tablet PC 486, collectively referred to as personal electronic devices (PEDs), to provide a response when lift truck 100/200 sends an alert, indicating that lift truck 100/200 is unable to progress further in executing the instruction(s) issued by system manager 460. In one example, a lift truck 100/200 may issue an alert to aid in proper identification of a target (e.g., a core 320 of a carpet roll 310) if pole cameras 112/212 and/or 166 were unsuccessful in providing images from which such a determination could be made. Automation controller may be operating a Windows® operating system and software configured to analyze the images provided. This analysis can be executed using "Halcon" and/or OpenCV functions (e.g., computer vision function libraries) to gather the data needed for analysis, apply one or more filters to remove non-relevant data, and analyze the remaining relevant data based on a formula designed to output results detailing an action for lift truck 100/200, such as moving mast 150/250, moving lift truck 100/200, generating an alert, and the like. Lift truck 100/200 is configured to receive one or more inputs from the operator to resolve the error condition. In some embodiments, lift truck 100/200 is configured to apply machine learning to analyze the input from the operators to determine how the error condition was remedied so the error is not repeated when a similar scenario occurs in the future.

Database 492 collects and stores one or a plurality of fields of information. For example, after completing a command of depositing a carpet roll at a location within a warehouse (e.g., an unload sequence), pole cameras 112/212 and/or 166 collect images of carpet rolls 310 (see, e.g., FIGS. 9 and 10B). These images can then be stored in database 492 for later reference when verifying the presence of a particular carpet roll. In some embodiments, the positional information (e.g., x-y location within a warehouse) and the height (e.g., z-direction) at which a particular carpet roll was deposited, as well as the diameter (e.g., "d" in FIG. 11B) of a deposited carpet roll are all transmitted to database 492 to enable future retrieval. 3D camera 160 provides the data necessary to determine vacancies in carpet racks 300; these vacancies identified are catalogued in database 492 based on the position (e.g, the x-y position) within the warehouse at which lift truck 100/200 is located when the vacancy is detected, as well as the height (e.g., the z-direction) of 3D camera 160 when the image was obtained. This height information allows for the shelf/row number (e.g., which shelf) on carpet rack 300 to be stored in database 492 as well.

Enterprise server 490 supplies information generated by system manager 460 to identify, request, and describe packages as needed. This information provides system manager 460 with a location for depositing or retrieving a carpet roll within warehouse 500 (see FIG. 7). With the location specified for the given action, system manager transmits the command to one of a plurality of lift trucks 100/200 operating within warehouse 500 via wireless access node 452, which lift trucks 100/200 receive via their onboard wireless antennas 450. In some embodiments, system manager provides an identifier unique to a carpet roll (e.g., a barcode) and lift trucks 100/200 wirelessly queries database 492 directly in order to determine the location where this particular carpet roll is located.

In some other embodiments, system manager 460 instructs lift trucks 100/200 to deposit a carpet roll (e.g., from a loading dock) within warehouse, but no destination is provided. In such instances, lift trucks lift trucks 100/200 are configured to determine, using line scanner 168 and pole camera 112/212 and the optical characteristics (e.g., focal length, aspect ratio, etc.) of pole camera 112/212, a width of the carpet roll being deposited. Lift trucks 100/200 are then configured to wirelessly query database 492, either directly or using enterprise server 490, in order to identify one or more vacancies in the warehouse that are large enough to accommodate the dimensions of the carpet roll being deposited. Database 492 is configured to return one or a plurality of suitable locations. Lift truck 100/200 is then configured to select an optimum location within warehouse 500. For example, where lift truck 100/200 has a backlog of further instructions to execute in various locations within warehouse 500, lift truck 100/200 is configured to select a vacancy that is closest to the start point of the next command to be executed. In some other instances, historical usage data for the particular kind of carpet being deposited can be cross-referenced, such that carpet rolls of a carpet type that is popular and shipped frequently may be stored at a location adjacent to the loading dock, whereas carpet types that are less frequently utilized and/or accessed may be stored in a more remote location within warehouse 500.

In another embodiment, system manager 460 issues a command to lift truck 100/200 detailing a type of carpet that needs to be retrieved from a carpet rack 300, but does not provide a location where a carpet roll of such a carpet type is located. In such instances, lift truck 100/200 is configured to wirelessly query database 492, either directly or using enterprise server 490, in order to identify one or more (e.g., all) of the locations where suitable carpet rolls are stored within warehouse. Lift truck 100/200 is then configured to select an optimal location from which a suitable carpet roll is to be retrieved. This optimal location can be selected by determining the distance of the carpet roll from the current position of lift truck 100/200 and also the distance from the carpet roll to the specified destination for delivery, thereby determining a minimum transit distance and/or time to maximize operational efficiency and minimize transit time of lift truck 100/200.

In still other embodiments, system manager 460 is configured to monitor a usage of lift trucks 100/200 within warehouse 500. In addition, lift trucks 100/200 may also be configured to monitor their own queue of instructions. When system manager 460 and/or lift trucks 100/200 determine that there is a lift truck 100/200 that is idle or soon will be idle (e.g., completing the last instruction in its queue), system manager 460 may either re-assign instructions currently assigned to another lift truck 100/200 or may provide the idle lift truck with a subsequent command to conduct an inventory of all or part of warehouse 500. In such embodiments, the locations within warehouse 500 that have gone the longest without being inventoried may be stored in database 492, so that this information can be queried by lift truck 100/200 or provided by system manager 460 as a location where lift truck 100/200 should begin the inventory process.

In yet another embodiment where system manager 460 detects one or more, but preferably at least two, lift trucks 100/200 are idle (e.g., at night), system manager 460 may query database 492 to identify the locations of all carpet rolls of one or more carpet types within warehouse 500. This may be done using enterprise server 490. Enterprise server 490 may also be configured to execute an algorithm that analyzes the current locations, sizes, usage rates, and total quantity of each carpet type in warehouse 500 in order to determine an optimized organizational scheme in warehouse 500 for each of the carpet rolls stored therein, such that enterprise server 490 generates a plurality of instructions that must be executed to achieve this optimized organizational scheme. System manager 460 is then configured to assign each of the instructions to one or more lift trucks 100/200. If higher priority instructions (e.g., retrieve a carpet roll and bring it to a loading dock) are received by system manager 460, then this higher priority instruction can be assigned to a lift truck 100/200 and assigned a high priority so that this high priority instruction will be immediately executed before any other instructions in the instruction queue of the lift truck 100/200 to which the high priority instruction is transmitted.

Figure 7:
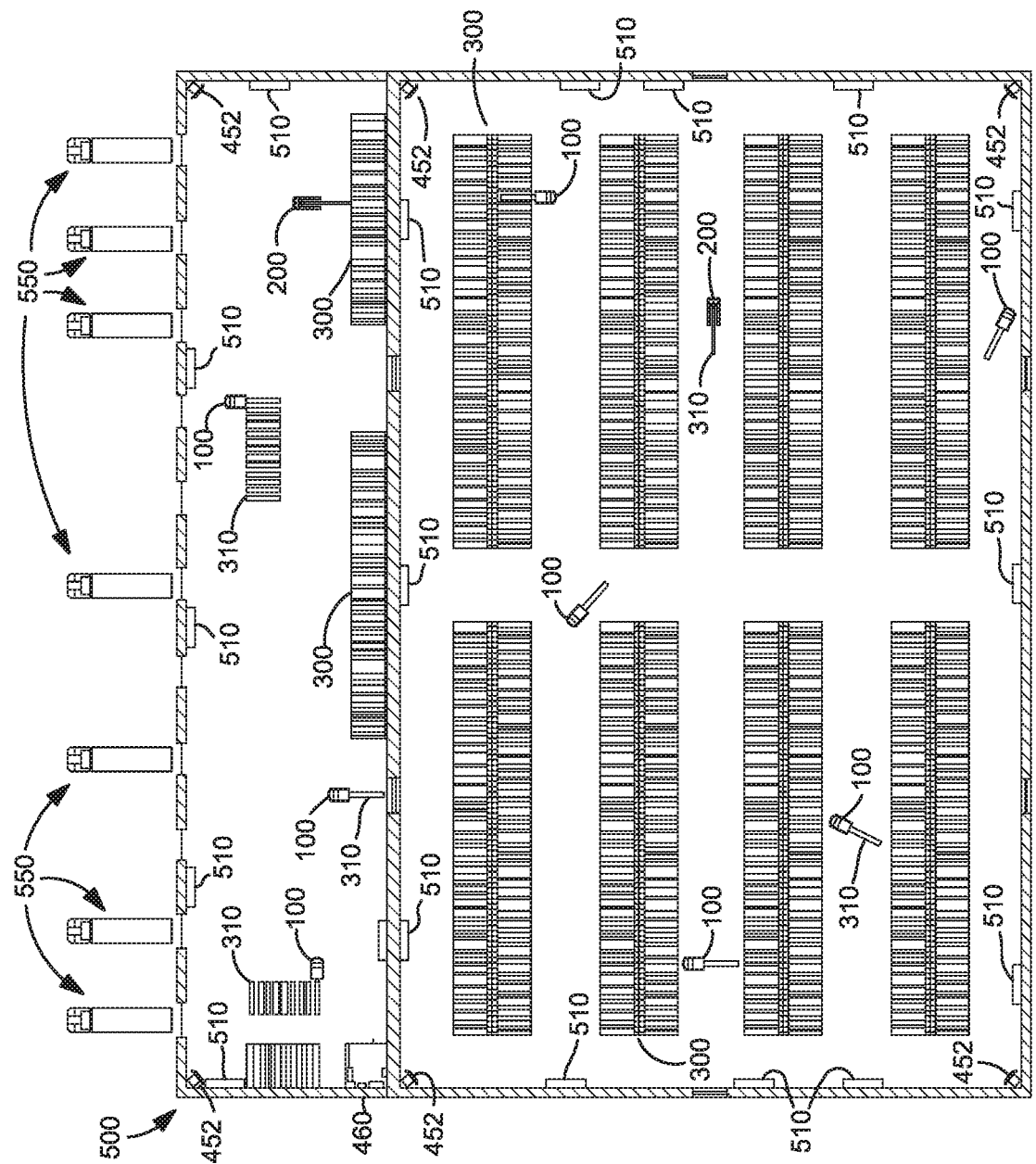
FIG. 7 is an example illustration of a warehouse having a plurality of lift trucks operating therein, in accordance with the disclosure herein.

Referring now to FIG. 7, a warehouse, generally designated 500, is shown. In this embodiment, warehouse is split into a portion adjacent to a loading dock and a portion that is farther away from the loading dock, where the majority of the carpet racks, generally designated 300, are shown. The layout of warehouse 500 is merely illustrative and lift trucks 100/200 may be utilized in any suitable warehouse layout. The warehouse 500 contains a plurality of carpet racks 300, a plurality of navigation buoys 510 (e.g., reflectors), and a plurality of lift trucks 100/200 operating autonomously therein. The areas between the racks are defined as aisles, generally designated 340 Lift trucks 100/200 are configured to travel throughout warehouse 500 while executing instructions provided by system manager 460. Navigation buoys 510 are distributed throughout the perimeter of warehouse 500. In some embodiments, navigation buoys 510 can be installed directly onto carpet racks 300. In such embodiments, lift trucks 100/200 can be calibrated within warehouse 500 to determine the layout of the carpet racks 300. In some other embodiments, lift trucks 100/200 are configured to use navigation buoys 510 and/or navigation sensor 128 and safety sensors 126 to navigate warehouse 500 without the need for calibration. Such instructions can contain an origin point (e.g., where to pick up the carpet roll 310) and a destination point (e.g., where to deposit the carpet roll 310), so that lift trucks 100/200 are configured to use its position detected from the navigational buoys 510, navigation sensor 128, and/or safety sensors 126 to plot a transit path between the origin point and the destination point through warehouse 500.

These Instructions are transmitted from system manager 460 to lift trucks 100/200 via a wireless network broadcast, over which wireless antennas 450 of lift trucks 100/200 are configured to receive and transmit information (e.g., digital or analog data), by a plurality of wireless access points 452. In some embodiments, warehouse 500 may be small enough to have only a single wireless access node 452. Lift trucks 100/200 retrieve carpet rolls 310 from carpet racks 300 and/or transport trucks 550, then lift trucks 100/200 carry carpet rolls 310 to a destination (e.g., a carpet rack 300 or a truck 550). In the scenario illustrated in FIG. 7, the loading dock of warehouse 500 is the set destination, where lift trucks 100/200 stage carpet rolls 300 to be loaded onto trucks 550. System manager 460 is configured to control the assignment of instructions to lift trucks 100/200 throughout warehouse 500 by monitoring the position and intended destination of each of lift trucks 100/200 and reassigning instructions to others of the lift trucks 100/200 based upon the operational status of each lift truck 100/200. For example, if one lift truck 100/200 has encountered a problem and sent a request to control room 480 for human intervention, the instructions in the queue of this lift truck 100/200 may be reassigned to others of the lift trucks 100/200, as needed. System manager 460 may be located within warehouse 500, as shown, or may be located remotely and be configured to manage a plurality of warehouses via the internet or any suitable telecommunications network.

Figure 8:
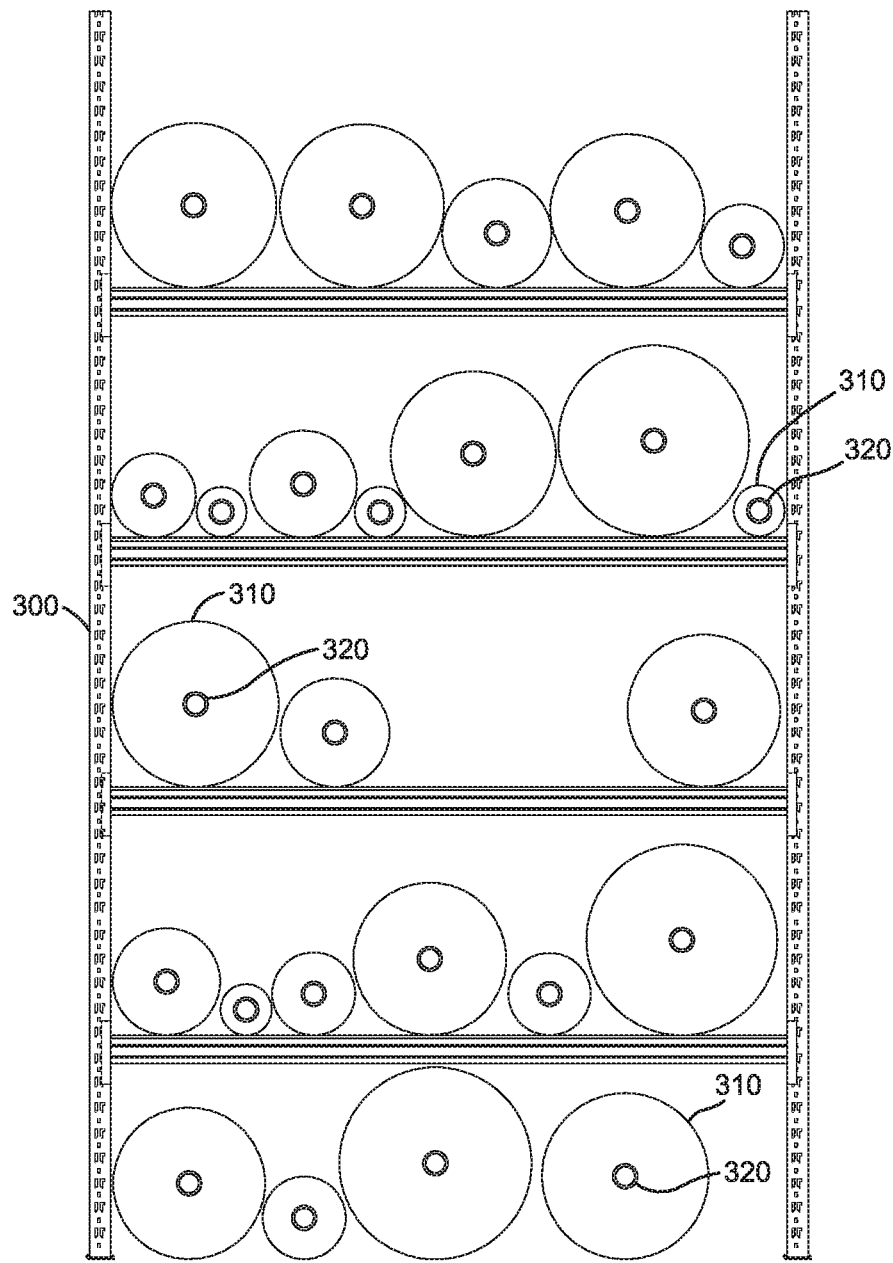
FIG. 8 shows a side view of a shelving rack with a plurality of carpet rolls disposed thereon, in accordance with the disclosure herein.

Referring now to FIG. 8, an example embodiment of a plurality of carpet rolls 310 are shown being located on a carpet rack 300 having 5 rows for the storage of carpet, including the floor surface. Each of the plurality of carpet rolls 310 have a core 320 in substantially the geometric center of each carpet roll 310. The term "substantially" is used herein because, while the carpet may be wrapped uniformly around core 320, the carpet may sag during storage, so that core 320 is no longer actually located in the geometric center of carpet roll 310. Core 310 is a hollow cylindrical form that is large enough for pole 110/210 to be inserted therein. It can be seen in FIG. 8 that carpet rolls 310 may be intermixed, such that carpets rolls 310 having different types of carpet and/or of different sized diameters are stored adjacent to each other. As noted above, system manager 460 and/or enterprise server 490 are configured to assign an optimal position for each carpet roll 310 within warehouse 500. In some embodiments, lift truck 100/200 is configured to detect the weight of the carpet roll being transported and may be restricted from depositing this carpet roll above a certain height, based on safety limits that would prevent storage of sufficiently heavy items at a height that would cause an unsafe working condition (e.g., create a risk of tipping over a carpet rack).

Figure 9:
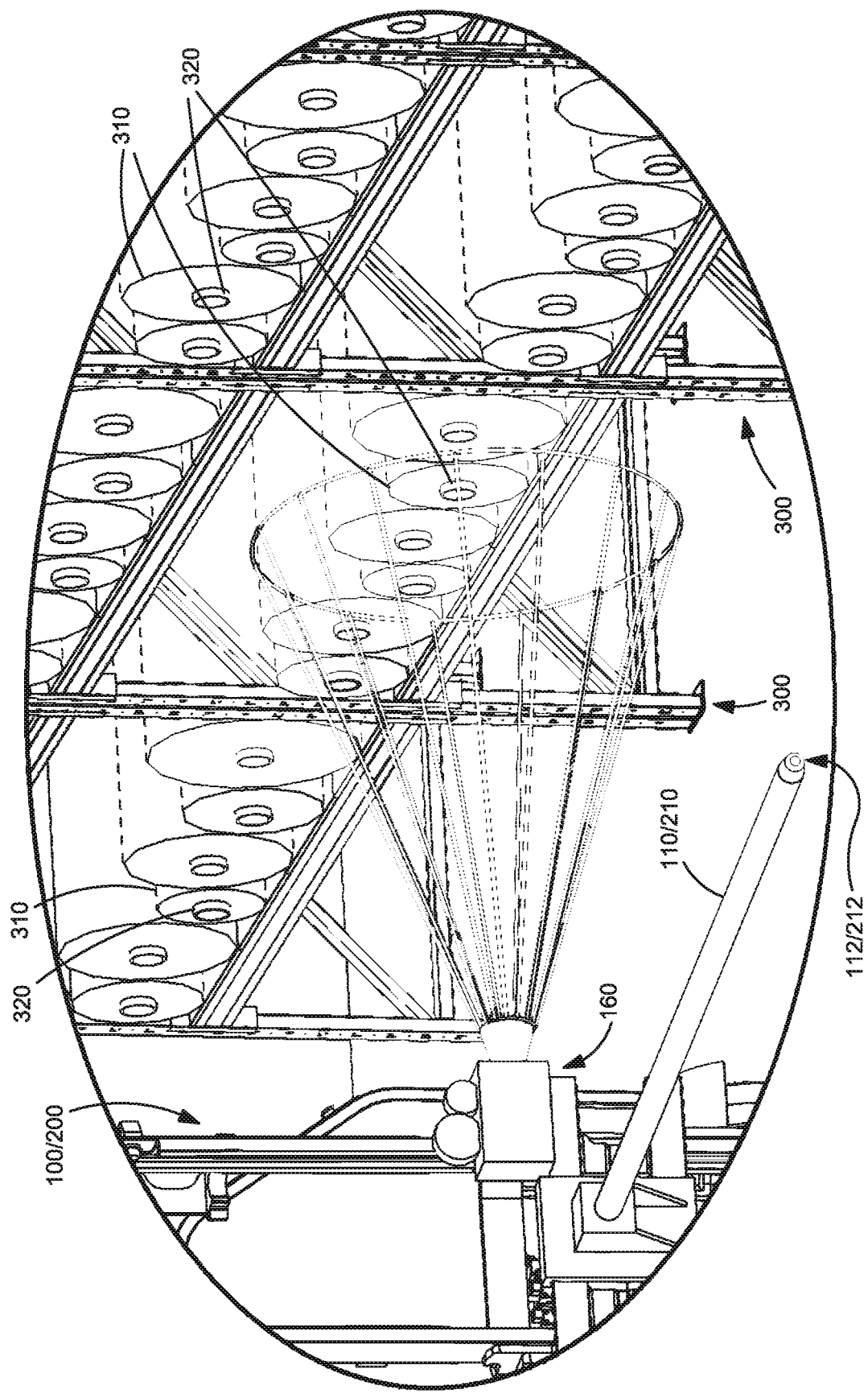
FIG. 9 is an example schematic illustration of a lift truck scanning a carpet rack, in accordance with the disclosure herein.

Referring now to FIG. 9, an illustration is provided that shows an example of how a lift truck 100/200 determines the presence of a carpet roll 310 sought before initiating the retrieval sequences illustrated in FIGS. 3A-3H and 4A-4G. To accomplish this, camera 166 views carpet racks 300 during travel of lift truck 100/200, capturing successive images to verify the existence and determine the location of a particular carpet roll 310 to be retrieved in executing the instructions. As noted above relative to FIGS. 1A, 1B, and 2, camera 166 is attached to lift truck 100/200 in such a way that the height of camera 166 can be changed to correspond to a height that would enable capturing images of the row of carpet rack 300 that the particular carpet roll 310 is indicated in the instructions as being stored on. First line scanner 162 is then configured to determine the distance from camera 166 to carpet rack 300. This distance measurement is then used lift truck 100/200 to analyze one or more of a label on a face of each carpet roll 310, as well as the appearance, size, shape, and/or position of each carpet roll 310. If the target carpet roll 310 is incapable of being identified, lift truck 100/200 generates an alert that is transmitted to a human operator for intervention via webserver 470. In some embodiments, the images of the target carpet roll 310 are transmitted to an operator (e.g., in operator control room 480) upon failure to confirm the identity of the target carpet roll 310, so the operators can visually confirm or deny the identity of the target carpet roll 310 from a remote location.

Figure 10A:
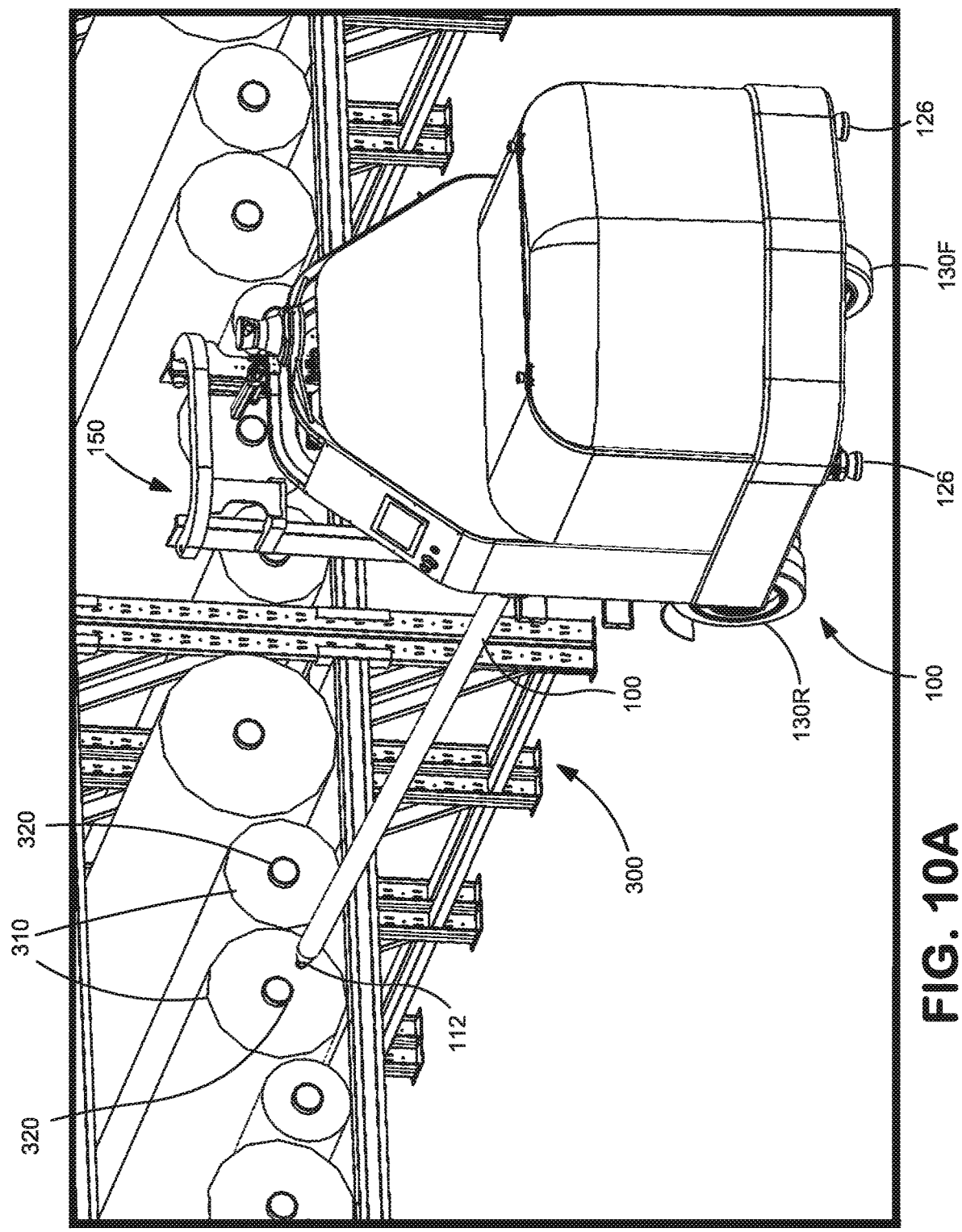
FIG. 10A shows a lift truck positioned adjacent to and aligned parallel to a carpet roll, in accordance with the disclosure herein.
Figure 10B:
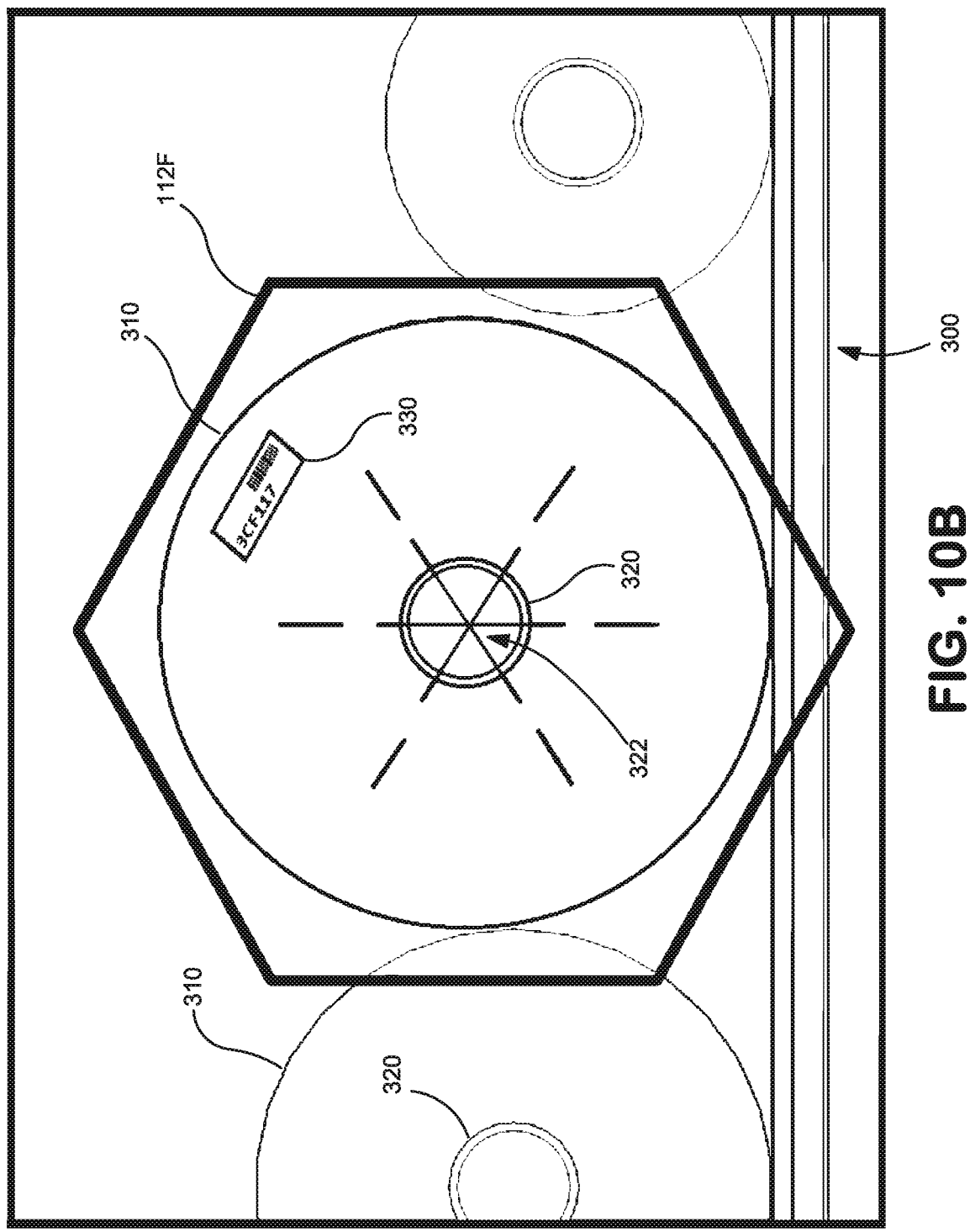
FIG. 10B shows an example image generated by a pole camera of the lift truck used to determine a center of a core for pole alignment and verification of the identity of the carpet roll to be retrieved, in accordance with the disclosure herein.

FIGS. 10A and 10B show two companion images of a lift truck 100/200 approaching a final target (e.g., an identified carpet roll 310) and a two-dimensional view of a visible end of a carpet roll 310 to be used during final targeting, respectively. As shown in FIG. 10A, lift truck 100/200 aligns itself perpendicular to carpet rack 300 and approaches the identified carpet roll 310. Once lift truck 100/200 is a certain distance, based on the optical characteristics of pole camera 112/212, away from carpet rack 300 lift truck 100/200 captures an image of the end of carpet roll 310, as shown in FIG. 10B. Lift truck 100/200 analyzes label 330 to perform secondary verification of the identity of carpet roll 310. Upon successful confirmation of the identification, lift truck 100/200 locates the center, generally designated 322, of carpet roll 310 using various vision algorithms 112F/212F. The reliability of the resulting analysis is determined and, if deemed satisfactory, lift truck 100/200 moves forward to engage pole 110/210 within core 320 of carpet roll 310 to pick up carpet roll 310. Unsuccessful analysis of label 330 or detection of center 322 of core 320 by vision algorithms 112F/212F are relayed to webserver 470 to be presented to a human operator for further intervention.

Furthermore, a method of managing an inventory of carpet rolls in a warehouse is provided. This method includes the steps of: providing one or more lift trucks in a warehouse with a plurality of carpet rolls on one or more carpet racks; sending, via a system manager, at least one instruction to a lift truck of the one or more lift trucks; determining an origin point associated with the at least one instruction; moving the lift truck to the origin point specified in the at least one instruction; scanning, via an infrared camera, carpet rolls on a carpet rack located to a side of a transit path determined by the lift truck moving to the origin point; detecting, via image processing, the carpet rolls scanned by the infrared camera; moving, once an identity of a carpet roll specified in the at least one instruction is detected, the lift truck to an insertion position, such that a pole attached to the lift truck is aligned with a core of the carpet roll specified in the at least one instruction; verifying, via an infrared pole camera mounted on a distal end of the pole, the identity of the carpet roll detected; processing one or more images from the pole camera to determine a center of the core of the carpet roll; inserting, after the identity of the carpet roll is verified and the center of the core is determined, the pole into the center of the core of the carpet roll; raising a mast, by which the pole is attached to the lift truck, to lift the carpet roll; transporting, using the lift truck, the carpet roll to a destination point specified by the at least one instruction; depositing the carpet roll at the destination point; transmitting, via a wireless antenna the system manager, a location and/or a height within the warehouse where the carpet roll was deposited; and storing the location and/or height in a database.

In some such embodiments, the method may include the further steps of: scanning an area around the lift truck with a plurality of safety scanners attached to the lift truck while the lift truck is moving; and plotting a new transit path, if possible, or stopping the lift truck when one or more objects are detected by the safety scanners.

In such embodiments, the step of moving the lift truck to align the pole with the core of the carpet roll may include independently controlling a locomotive force and wheel angle of each of a plurality of wheels of the lift truck so the lift truck is pivoted into the insertion position in a continuous movement without stopping. Further, the method may include, when the pole is not aligned with the center of the core, using lateral actuators to adjust a lateral position of the pole relative to the mast to align the pole with the center of the core.

The method may further include aspects where, when the lift truck encounters an error, generating an alert, transmitting the alert to an operator via a webserver, and providing input from the operator via the webserver to the lift truck to remedy the error.

In certain aspects of the method, inserting the pole into the center of the core of the carpet roll may include moving the mast on one or more tracks extending parallel to a direction of extension of the pole so that the pole is extended relative to a perimeter of the lift truck and into the core of the carpet roll without moving the lift truck relative to the carpet rack, with the carpet roll being extracted from the carpet rack by moving the mast on the one or more tracks so that the pole is retracted relative to the perimeter of the lift truck without moving the lift truck relative to the carpet rack, and the carpet roll being supported by one or more support surfaces on side portions of a frame of the lift truck while the lift truck is transporting the carpet roll to the destination point.

In some embodiments, the method comprises sending, via the system manager when one of the one or more lift trucks is idle, an instruction to the idle lift truck to perform an inventory scan of a portion of the warehouse. The inventory scan includes the steps of: positioning a 3D camera mounted to the lift truck at a height corresponding to a height at which carpet rolls are stored on the carpet racks; moving the lift truck through respective portions of the warehouse; detecting a vacancy between adjacent carpet rolls; determining a size of the vacancy my measuring a distance between the adjacent carpet rolls; recording a position and/or height within the warehouse at which the vacancy was detected; transmitting, via the wireless antenna, the position and/or height of the vacancy to the system manager; and storing the location and/or height of the vacancy in the database. In such embodiments, the method may further include the steps of: detecting a trailing edge of a first carpet roll of the adjacent carpet rolls; detecting a leading edge of a second carpet roll of the adjacent carpet rolls; defining respective vertical lines that are tangent to a perimeter of each of the trailing edge of the first carpet roll and the leading edge of the second carpet roll; and measuring a distance between the respective vertical lines to determine a distance therebetween (e.g., between the vertical lines). In still other such embodiments, the method comprises comparing the size of the vacancy to a smallest permissible size of carpet roll used in the warehouse and, if the size of the vacancy is smaller than the smallest permissible size of carpet roll used, disregarding the vacancy so that the vacancy is not stored in the database.

Figure 11A:
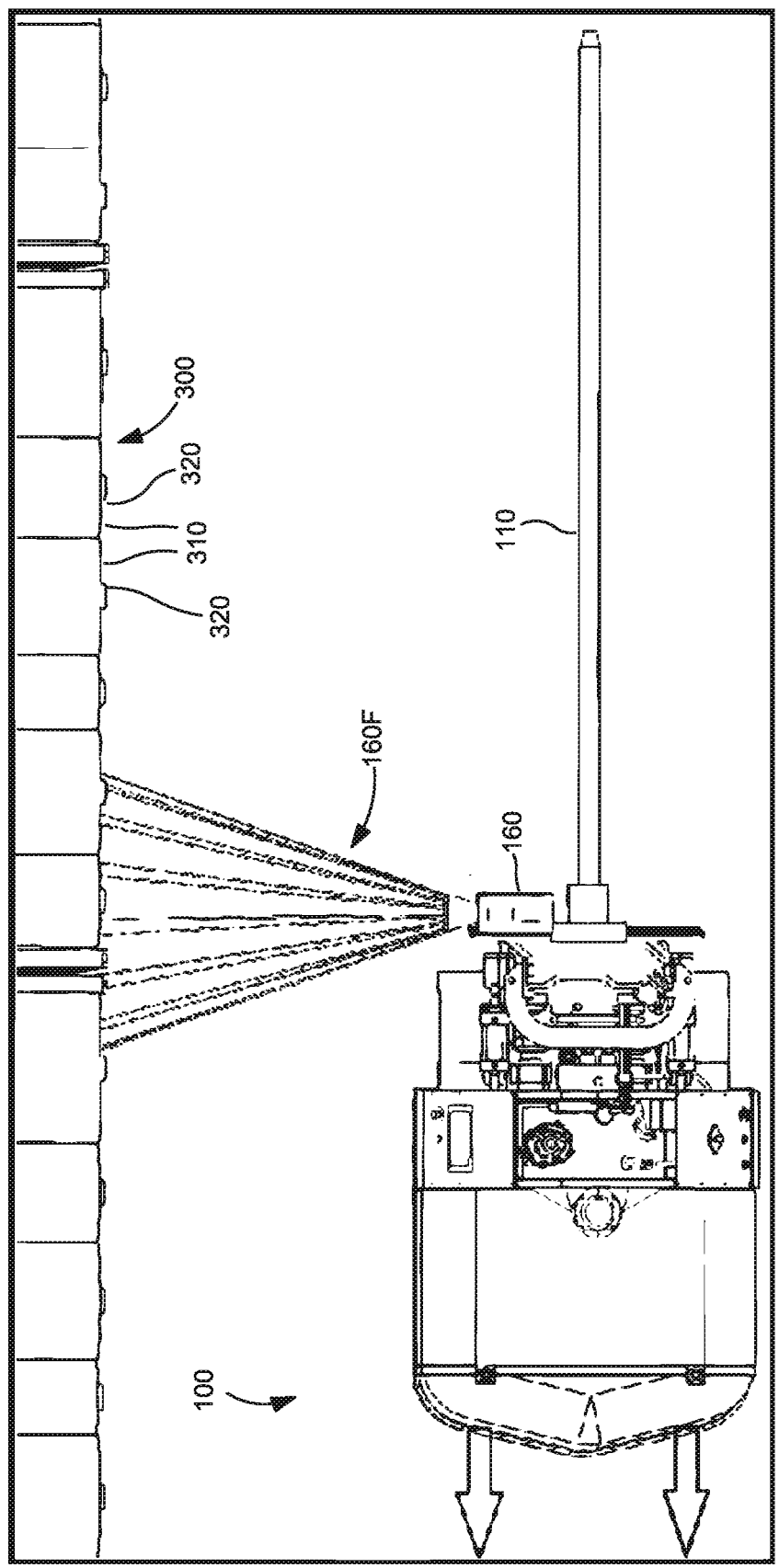
FIG. 11A shows the lift truck of FIGS. 1A and 1B scanning a section of shelving using the 3D camera in order to identify vacant positions within the shelving section, in accordance with the disclosure herein.
Figure 11B:
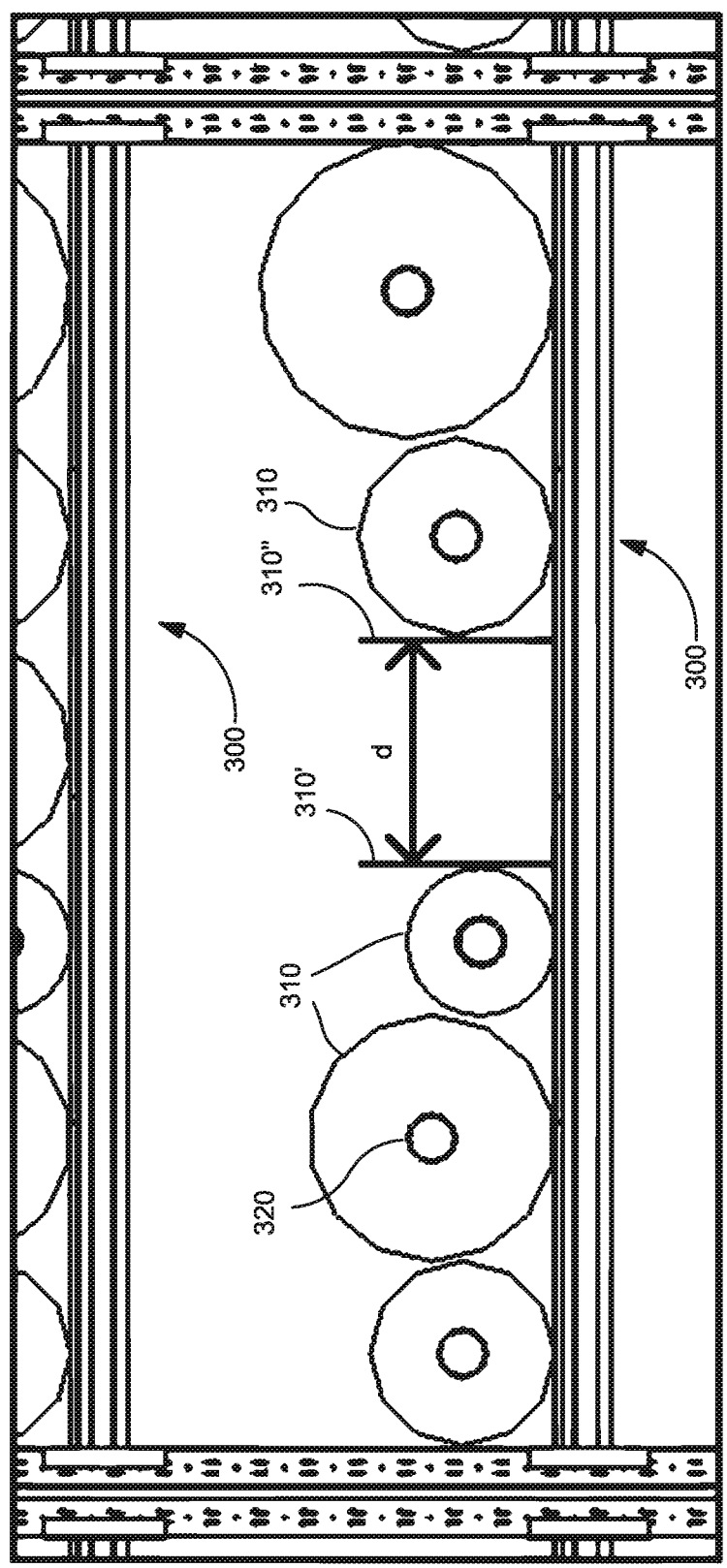
FIG. 11B is an example schematic illustration of how the distance between adjacent carpet rolls is calculated for vacancy detection, in accordance with the disclosure herein.

FIGS. 11A and 11B illustrate lift truck 100 when executing a set of inventory instructions. According to this method, a lift truck 100/200 receives at least one instruction to perform an inventory scan of carpet racks 300 in a warehouse. In some embodiments, lift trucks 100/200 are configured to perform an inventory scan when moving throughout warehouse 500 in executing other instructions (e.g., during transit to deposit and/or retrieve a carpet roll 310). Regardless, during an inventory scan, lift truck 100/200 uses 3D camera 160, first to scan surrounding carpet racks 310 for carpet rolls and vacancies located along the transit path of lift truck 100/200. 3D camera 160 is configured to accumulate a "point cloud" (e.g., a series of points in three-dimensional space) with one or more of initial and final positions (e.g., x-y coordinates) of the each vacancy detected within warehouse 500, as well as the height at which the vacancy is detected. This height measurement can be provided in any suitable form, such as a row on a carpet rack 300, if the row spacing is uniform across warehouse 500, in inches, millimeters, or any other unit of measure. The images produced by 3D camera 160 are processed to measure the distance between two artificial lines, each line being oriented vertically and drawn tangentially to carpet rolls 310 located on each side of the vacancy. The location of initial line 310' and final line 310" will be converted to x-y coordinates within the warehouse, as well as the height at which the vacancy was measured, if the distance between them is above the threshold to be classified as a vacancy (e.g., is not a small gap that is too small for any carpet roll to be inserted therein).

The embodiments described herein are examples only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims.

What is claimed is:

1. A system for managing an inventory of carpet rolls in a warehouse, the system comprising:
   one or more autonomous lift trucks comprising:
      a frame;
      a mast attached to the frame;
      a pole fixedly mounted on the mast by a carrier, which is movable laterally in a direction perpendicular to a direction of a length of the pole by one or more hydraulic, pneumatic, or electrical lateral actuators, wherein the pole is configured to be inserted concentrically within a core of a carpet roll to lift the carpet roll for transport;
      a plurality of imaging devices mounted on each lift truck in a displaceable manner;
      at least one navigation sensor;
      at least one safety sensor;
      at least one emergency stop; and
      at least three wheels, comprising two traction wheels located in a same vertical plane on opposite sides of the lift truck and one steering wheel, wherein the traction wheels are each configured to apply a locomotive force to the lift truck and the steering wheel is configured to rotate to change a direction of travel of the lift truck;
   a database configured to store location information for a plurality of carpet rolls in the warehouse;
   a server in electronic communication with the database; and
   a system manager configured to send one or more instructions to the one or more lift trucks.

2. The system of claim 1, wherein:
   the plurality of imaging devices comprises a three-dimensional (3D) camera and/or one or more line scanners, wherein the 3D camera and/or the one or more line scanners are configured to generate a 3D image as a point cloud comprising a plurality of data points in three-dimensional space;
   the lift truck is configured to use the point cloud to detect a vacancy on or in a carpet rack in the warehouse;
   the lift truck is configured to determine a location and height within the warehouse where the vacancy is detected; and
   the lift truck is configured to wirelessly transmit the location and height of the vacancy to the server and/or the system manager to be stored in the database.

3. The system of claim 1, wherein the lift truck is configured to generate an alert when an error condition occurs and to transmit the alert to an operator control room and/or a portable electronic device held by an operator.

4. The system of claim 3, wherein the lift truck is configured to receive one or more inputs from the operator to resolve the error, wherein the one or more inputs are transmitted remotely to the lift truck, and wherein the lift truck is configured to analyze the one or more inputs to determine how the error condition was resolved.

5. The system of claim 4, wherein the lift truck is configured to adapt a control algorithm, which is used for navigating the lift truck or detecting and identifying carpet rolls with the plurality of imaging device, so that the error is not repeated when a similar scenario occurs in the future.

6. The system of claim 1, comprising a plurality of navigational markers distributed throughout the warehouse, wherein the navigation sensor is configured to detect, via the navigational markers, a position of the lift truck within the warehouse.

7. The system of claim 6, wherein the lift truck is configured to use the position detected to plot a transit path between an origin point and a destination point through the warehouse.

8. The system of claim 7, wherein each of the lift trucks comprise a plurality of safety sensors, and wherein each of the lift trucks are configured to alter the transit path when one or more objects are detected in the transit path of a corresponding one of the lift trucks by the plurality of safety sensors.

9. A lift truck for autonomous storage and retrieval of carpet rolls in a warehouse, the lift truck comprising:
a frame;
a mast attached to the frame;
a cylindrically-shaped pole fixedly mounted on the mast by a carrier, which is movable laterally in a direction perpendicular to a direction of a length of the pole by one or more hydraulic, pneumatic, or electrical lateral actuators, wherein the pole is configured to be inserted concentrically within a core of a carpet roll to lift the carpet roll for transport;
a plurality of imaging devices mounted on the lift truck in a displaceable manner;
at least one navigation sensor;
at least one safety sensor;
at least one emergency stop; and
at least three wheels, comprising two traction wheels located in a same vertical plane on opposite sides of the lift truck and one steering wheel, wherein the traction wheels are each configured to apply a locomotive force to the lift truck and the steering wheel is configured to rotate to change a direction of travel of the lift truck.

10. The lift truck of claim 9, wherein the two traction wheels are independently controlled so that each of the two traction wheels can be rotated at different speeds for turning the lift truck.

11. The lift truck of claim 9, wherein the plurality of imaging devices comprises a three-dimensional (3D) camera and/or one or more line scanners, wherein the 3D camera and/or the one or more line scanners are configured to generate a 3D image as a point cloud comprising a plurality of data points in three-dimensional space, and wherein the lift truck is configured to use the point cloud to use the point cloud to detect a vacancy on or in a carpet rack in the warehouse.

12. The lift truck of claim 9, wherein the plurality of imaging devices comprises an infrared pole camera mounted on a distal end of the pole and a line scanner mounted at the proximal end of the pole and pointing along a length of the pole, wherein the line scanner is configured to measure a distance to a carpet roll and the pole camera is configured to generate an image of an end of a carpet roll during retrieval of a carpet roll.

13. The lift truck of claim 9, wherein the at least three wheels are four wheels, wherein each of the four wheels are configured to pivot to guide a motion of the lift truck by a dedicated steering motor and driven forward and backward by a dedicated traction motor.

14. The lift truck of claim 9, comprising one or more infrared light sources, wherein the plurality of imaging devices comprises an infrared camera configured to detect a core of a carpet roll and/or a label affixed to an end of the carpet rolls.

15. The lift truck of claim 14, wherein the plurality of imaging devices comprises one or more line scanners configured to measure a distance from the lift truck to the carpet rolls.

16. The lift truck of claim 9, wherein the frame is U-shaped, with two side portions of the frame being connected by a front portion of the frame, wherein the front portion is opposite an end of the lift truck in a direction of extension of the pole.

17. The lift truck of claim 16, wherein one or more of the side portions of the frame comprise a track in a direction parallel to the direction of extension of the pole, wherein the mast is attached to and configured to move along the tracks of the side portions, and wherein the pole is configured to be extended and retracted relative to a perimeter of the frame as the mast moves along the tracks.

18. The lift truck of claim 17, wherein the side portions of the frame comprise a support surface by which the carpet roll is configured to be supported while the lift truck is in motion.

19. A method of managing an inventory of carpet rolls in a warehouse, the method comprising:
providing one or more lift trucks in a warehouse comprising a plurality of carpet rolls on one or more carpet racks;
sending, via a system manager, at least one instruction to a lift truck of the one or more lift trucks;
determining an origin point associated with the at least one instruction;
moving the lift truck to the origin point specified in the at least one instruction;
scanning, via an infrared camera, carpet rolls on a carpet rack located to a side of a transit path determined by the lift truck moving to the origin point;
detecting, via image processing, the carpet rolls scanned by the infrared camera;
moving, once an identity of a carpet roll specified in the at least one instruction is detected, the lift truck to an insertion position, such that a pole attached to the lift truck is aligned with a core of the carpet roll specified in the at least one instruction;
verifying, via an infrared pole camera mounted on a distal end of the pole, the identity of the carpet roll detected;
processing one or more images from the pole camera to determine a center of the core of the carpet roll;
inserting, after the identity of the carpet roll is verified and the center of the core is determined, the pole into the center of the core of the carpet roll;
raising a mast, by which the pole is attached to the lift truck, to lift the carpet roll;
transporting, using the lift truck, the carpet roll to a destination point specified by the at least one instruction;
depositing the carpet roll at the destination point;
transmitting, via a wireless antenna the system manager, a location and/or a height within the warehouse where the carpet roll was deposited; and
storing the location and/or height in a database.

20. The method of claim 19, wherein moving the lift truck to align the pole with the core of the carpet roll comprises independently controlling a locomotive force and wheel angle of each of a plurality of wheels of the lift truck so the lift truck is pivoted into the insertion position in a continuous movement without stopping.

21. The method of claim 19, comprising, when the pole is not aligned with the center of the core, using lateral actuators to adjust a lateral position of the pole relative to the mast to align the pole with the center of the core.

22. The method of claim 19, comprising, when the lift truck encounters an error, generating an alert, transmitting the alert to an operator via a webserver, and providing input from the operator via the webserver to the lift truck to remedy the error.

23. The method of claim 19, wherein inserting the pole into the center of the core of the carpet roll comprises moving the mast on one or more tracks extending parallel to a direction of extension of the pole so that the pole is extended relative to a perimeter of the lift truck and into the core of the carpet roll without moving the lift truck relative to the carpet rack, wherein the carpet roll is extracted from the carpet rack by moving the mast on the one or more tracks so that the pole is retracted relative to the perimeter of the lift truck without moving the lift truck relative to the carpet rack, and wherein the carpet roll is supported by one or more support surfaces on side portions of a frame of the lift truck while the lift truck is transporting the carpet roll to the destination point.

24. The method of claim 19, comprising:
scanning an area around the lift truck with a plurality of safety scanners attached to the lift truck while the lift truck is moving;
plotting a new transit path; and
moving the lift truck along the new transit path, or
stopping the lift truck when one or more objects are detected along the new transit path by the safety scanners.

25. The method of claim 19, comprising:
sending, via the system manager when one of the one or more lift trucks is idle, an instruction to the idle lift truck to perform an inventory scan of a portion of the warehouse,
wherein the inventory scan comprises:
positioning a 3D camera and/or one or more line scanners mounted to the lift truck at a height corresponding to a height at which carpet rolls are stored on the carpet racks;
moving the lift truck through respective portions of the warehouse;
generating a 3D image as a point cloud comprising a plurality of data points in three-dimensional space;
detecting a vacancy between adjacent carpet rolls;
determining a size of the vacancy by measuring a distance between the adjacent carpet rolls;
recording a position and/or height within the warehouse at which the vacancy was detected;
transmitting, via the wireless antenna, the position and/or height of the vacancy to the system manager; and
storing the location and/or height of the vacancy in the database.

26. The method of claim 25, comprising comparing the size of the vacancy to a smallest permissible size of carpet roll used in the warehouse and, if the size of the vacancy is smaller than the smallest permissible size of carpet roll used, disregarding the vacancy so that the vacancy is not stored in the database.

27. The method of claim 26, wherein determining a size of the vacancy comprises:
detecting a trailing edge of a first carpet roll of the adjacent carpet rolls;
detecting a leading edge of a second carpet roll of the adjacent carpet rolls;
defining respective vertical lines that are tangent to a perimeter of each of the trailing edge of the first carpet roll and the leading edge of the second carpet roll; and
measuring a distance between the respective vertical lines to determine a distance therebetween.

* * * * *